United States Patent
Xu et al.

(10) Patent No.: US 12,518,145 B2
(45) Date of Patent: Jan. 6, 2026

(54) NEURAL NETWORK TRAINING METHOD AND APPARATUS

(71) Applicant: Huawei Technologies Co., Ltd., Shenzhen (CN)

(72) Inventors: Yixing Xu, Beijing (CN); Yehui Tang, Beijing (CN); Li Qian, Shenzhen (CN); Yunhe Wang, Beijing (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 832 days.

(21) Appl. No.: 17/848,081

(22) Filed: Jun. 23, 2022

(65) Prior Publication Data

US 2022/0327363 A1   Oct. 13, 2022

Related U.S. Application Data

(63) Continuation of application No. PCT/CN2020/138651, filed on Dec. 23, 2020.

(30) Foreign Application Priority Data

Dec. 24, 2019   (CN) .......................... 201911351051.8

(51) Int. Cl.
  *G06N 3/048*   (2023.01)
  *G06N 3/084*   (2023.01)
(52) U.S. Cl.
  CPC ............. *G06N 3/048* (2023.01); *G06N 3/084* (2013.01)
(58) Field of Classification Search
  CPC .............................. G06N 3/044; G06N 3/0442
  See application file for complete search history.

(56) References Cited

U.S. PATENT DOCUMENTS 10,366,329 B2   7/2019   Hinton et al.
2022/0327363 A1   10/2022   Xu et al.

FOREIGN PATENT DOCUMENTS

CN   108256630 A   7/2018
CN   108562811 A   9/2018
CN   111797970 A   10/2020

OTHER PUBLICATIONS

Pham V, Bluche T, Kermorvant C, Louradour J. Dropout improves recurrent neural networks for handwriting recognition. In2014 14th international conference on frontiers in handwriting recognition Sep. 1, 2014 (pp. 285-290). IEEE. (Year: 2014).*

(Continued)

*Primary Examiner* — Schyler S Sanks
(74) *Attorney, Agent, or Firm* — Conley Rose, P.C.

(57) ABSTRACT

A neural network training method in an artificial intelligence (AI) field includes inputting training data into a neural network; determining a first input space of a second target layer in the neural network based on a first output space of a first target layer in the neural network; and inputting a feature vector in the first input space into the second target layer, where a capability of fitting random noise by the neural network when the feature vector in the first input space is input into the second target layer is lower than a capability of fitting the random noise by using an output space that is in the neural network and that exists when a feature vector in the first output space is input into the second target layer.

21 Claims, 12 Drawing Sheets

(56) References Cited

OTHER PUBLICATIONS

Gao W, Zhou ZH. Dropout rademacher complexity of deep neural networks. Science China Information Sciences. Jul. 2016;59:1-2. (Year: 2016).*
Srivastava N, Hinton G, Krizhevsky A, Sutskever I, Salakhutdinov R. Dropout: a simple way to prevent neural networks from overfitting. The journal of machine learning research. Jan. 1, 2014;15(1):1929-58. (Year: 2014).*
Aidan N. Gomez et al., "Targeted Dropout," CDNNRIA Workshop at the 32nd Conference on Neural Information Processing Systems, 2018, Montreal, Canada, 8 pages.
Golnaz Ghiasi et al., "DropBlock: A regularization method for convolutional networks," Oct. 30, 2018, 11 pages.
Nitish Srivastava et al, "Dropout: A Simple Way to Prevent Neural Networks from Overfitting," Journal of Machine Learning Research 15, 2014, 30 pages.
G. E. Hinton et al, "Improving neural networks by preventing co-adaptation of feature detectors," Jul. 3, 2012, 18 pages.
Daniel Ho et al, "Population Based Augmentation: Efficient Learning of Augmentation Policy Schedules," Proceedings of the 36 th International Conference on Machine Learning, Long Beach, California, PMLR 97, 2019, 11 pages.
Li Wan et al, "Regularization of Neural Networks using DropConnect," Proceedings of the 30th International Conference on Machine Learning, Atlanta, Georgia, USA, 2013, 9 pages.
Wang Xinying, "Research on Multivariate Time Series Prediction based on Random Project Neural Networks," Dalian University of Technology, Jun. 2015, with an English Abstract, 136 pages.

\* cited by examiner

NEURAL NETWORK TRAINING METHOD AND APPARATUS

CROSS-REFERENCE TO RELATED APPLICATIONS

This is a continuation of International Patent Application No. PCT/CN2020/138651 filed on Dec. 23, 2020, which claims priority to Chinese Patent Application No. 201911351051.8 filed on Dec. 24, 2019. The disclosures of the aforementioned applications are hereby incorporated by reference in their entireties.

TECHNICAL FIELD

This disclosure relates to the artificial intelligence (AI) field, and in particular, to a neural network training method and apparatus.

BACKGROUND

A deep neural network (DNN) may be understood as a neural network including a plurality of hidden layers, and there is no special measurement standard for "a plurality of" herein. According to locations of different layers, the DNN may include an input layer, a hidden layer, and an output layer. Usually, a first layer is an input layer, a last layer is an output layer, and a middle layer is a hidden layer.

Work carried out at each layer in the DNN may be described by using a mathematical expression $\vec{y}=a(W\cdot\vec{x}+b)$. From a physical level, it can be understood that the work carried out at each layer in the DNN is to perform five types of operations on the input space (a set of input vectors), to complete conversion from an input space to an output space (in other words, from a row space of a matrix to a column space). The five types of operations include dimension raising/dimension reduction, scaling up/scaling down, rotation, translation, and "bending", the first three operations are completed by using "$W\cdot\vec{x}$", the fourth operation is completed by using "+b", and the fifth operation is implemented by using "a( )". A reason of using the word "space" herein for description is that a classified object is not a single thing, but a kind of thing, and space refers to a set of all individuals of this kind of thing. W is a weight matrix, and each value in the vector represents a weight value of a neuron in the layer of neural network. The vector W determines space transformation from the input space to the output space described above, to be specific, a weight W of each layer controls how to transform space.

There is an overfitting problem in the DNN. To be specific, although a function fitted by the DNN can be used to perfectly predict a training set, a prediction result of a test set including new data is poor. Overfitting reduces performance that is of the DNN and that exists when the DNN processes new data.

SUMMARY

This disclosure provides a neural network training method, a method for processing data by using a neural network, and a related apparatus, to help avoid an overfitting phenomenon that occurs in the neural network, and help improve performance that is of the neural network and that exists when the neural network processes an image, text, or speech.

According to a first aspect, this disclosure provides a neural network training method. The method includes inputting training data into a neural network, where the training data includes an image, text, or speech, determining a first input space of a second target layer in the neural network based on a first output space of a first target layer in the neural network, and inputting a feature vector in the first input space into the second target layer, to train the neural network, where a capability of fitting random noise by using an output space that is of a third target layer in the neural network and that exists when the feature vector in the first input space is input into the second target layer is lower than a capability of fitting the random noise by using an output space that is of the third target layer and that exists when a feature vector in the first output space is input into the second target layer.

In the method, after the first target layer outputs the first output space, the feature vector in the first output space is not directly input into the second target layer. Instead, the first output space is processed, and a feature vector in a first input space obtained through processing is input into the second target layer, to continue to train the neural network. In addition, in comparison with the first output space existing before processing, after the first input space obtained through processing is input into the second target layer, a capability of fitting noise by using the output space of the third target layer after the second target layer may be lowered, in other words, a capability of fitting noise in the neural network may be lowered. Therefore, an overfitting phenomenon that occurs in the neural network can be avoided, and a generalization capability of the neural network can be improved, to finally help improve performance that exists when the neural network processes an image, text, or speech, for example, accuracy of a prediction result.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In this implementation, in comparison with the first output space, after the first input space determined based on the first output space is input into the second target layer, Rademacher complexity of the output space of the third target layer can be reduced. Because the capability of fitting noise by using the output space of the third target layer is also reduced correspondingly after the Rademacher complexity of the output space of the third target layer is reduced, an overfitting phenomenon that occurs in the neural network can be avoided, and a generalization capability of the neural network can be improved, to finally help improve performance that exists when the neural network processes an image, text, or speech.

The neural network in the method may be a DNN, the second target layer is usually a $1^{st}$ layer after the first target layer, the third target layer is usually a layer after the first target layer, and the third target layer may be the second target layer, or may be another layer after the second target layer.

In some possible implementations, determining a first input space of a second target layer in the neural network based on a first output space of a first target layer in the neural network includes: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In this implementation, because the target function includes the first relational expression for calculating the Rademacher complexity of the second target layer, the gradient of the target function is obtained, the gradient is determined as the perturbation value increment, the target perturbation value is determined based on the perturbation value increment, and perturbation processing is performed on the first output space based on the target perturbation value, to obtain the first input space, so that after the first input space is input into the second target layer, Rademacher complexity of an output space corresponding to the second target layer greatly decreases. Therefore, a capability of fitting noise by using the output space of the second target layer can be greatly reduced, and training efficiency can be improved.

In some possible implementations, determining the first input space based on the target perturbation value and the first output space includes determining a target function value of the target function based on the target perturbation value, the first output space, and the weight matrix of the second target layer, and when a difference between the target function value and an initial function value is less than or equal to a preset threshold, performing perturbation adjustment on the first output space based on the target perturbation value, and determining that an output space obtained through adjustment is the first input space, or when a difference between the target function value and an initial function value is greater than a preset threshold, updating the initial function value to the target function value, updating the initial perturbation value to the target perturbation value, and repeatedly performing step 1 to step 3.

In this implementation, step 1 to step 3 are repeatedly performed until the target function converges, a corresponding target perturbation value existing when the target function converges is used as a final perturbation value, the first output space is adjusted based on the final perturbation value, and the output space obtained through adjustment is used as the first input space. In this way, after the first input space is input into the second target layer, an overfitting phenomenon existing in the neural network can be better avoided based on a capability of fitting noise by using an output space of the second target layer.

Optionally, in some possible implementations, when the first input space is determined based on the target perturbation value and the first output space, perturbation processing may be directly performed on the first output space based on the target perturbation value, and an output space obtained through processing is used as the first input space.

Optionally, in some possible implementations, when the first input space is determined based on the target perturbation value and the first output space, whether to stop iteration may be determined based on a difference between perturbation value increments in two iteration processes. For example, the iteration is stopped when the difference between perturbation value increments in two adjacent iteration processes is less than or equal to a preset threshold.

In some possible implementations, the target function further includes a regular term of the perturbation value of the first output space.

In other words, in addition to the first relational expression for calculating the Rademacher complexity of the second target layer, the target function further includes the regular term of the perturbation value of the first output space. In this way, a magnitude of a perturbation value increment obtained through calculation each time may be constrained, to constrain a value of a target perturbation value obtained through calculation each time, so that Rademacher complexity of an output space corresponding to the second target layer can be prevented from being too small, and a loss on an expression capability of the neural network can be prevented from being too large, to finally help guarantee performance of the neural network.

Optionally, in some possible implementations, the target function includes another regular term of the perturbation value of the first output space. For example, the regular term may be a relational expression of an average value of the perturbation value of the first output space.

For example, when the neural network includes a classification network, in the foregoing several implementations, a classification precision difference between a test set and a training set can be narrowed without obviously reducing classification precision, to improve performance of the neural network.

In some possible implementations, an expression of the target function is as follows:

$$\frac{1}{N}\left[\sup_k \left| \left\langle K'[k,:], \sum_{i=1}^N \sigma_i \left[f(x_i) - m_i \circ \varepsilon_i\right] \right\rangle \right| + \frac{\lambda}{2} \sum_{i=1}^N \|\varepsilon_i\|_2^2 \right],$$

where $\sigma_i$ is $-1$ or $1$, $K'[k,:]$ represents a $k^{th}$ row in the weight matrix of the second target layer, "$\langle , \rangle$" represents pointwise multiplication, $$\sup_k \left| \left\langle K'[k,:]^T, \sum_{i=1}^N \sigma_i [f(x_i) - m_i \circ \varepsilon_i] \right\rangle \right|$$

represents that k in $$\sup_k \left| \left\langle K'[k,:]^T, \sum_{i=1}^N \sigma_i [f(x_i) - m_i \circ \varepsilon_i] \right\rangle \right|$$

is used to maximize a value of $$\left| \left\langle K'[k,:]^T, \sum_{i=1}^N \sigma_i [f(x_i) - m_i \circ \varepsilon_i] \right\rangle \right|,$$

"$\| \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "∘" represents element-wise multiplication, a length of $m_i$ is the same as a length of $f(x_i)$, a value of each element in $m_i$ is 0 or 1, $\varepsilon_i$ indicates the perturbation value of the first output space, and $\lambda$ is a preconfigured parameter value.

In some possible implementations, the first output space, the perturbation value of the first output space, and the first input space satisfy the following relationship:

$$\tilde{f}(x_i)=f(x_i)-m_i\circ\varepsilon_i,$$

where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "∘" represents element-wise multiplication, $\tilde{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

For example, the first input space may be calculated based on the first output space and the target perturbation value by using the relational expression.

In the first aspect, the first target layer may be any one of a first layer to a penultimate layer in the neural network. During training of the neural network, processing in the foregoing implementations may be performed for any one or more layers of the first layer to the penultimate layer in the neural network.

In some possible implementations, the neural network is a convolutional neural network, and the first target layer is a convolutional layer or a fully connected layer. In this case, when a convolutional neural network obtained through training in the method in this disclosure is used to process a new image, text, or speech, better processing performance can be obtained. For example, when the neural network is used for image classification, accuracy of classification performed by the neural network obtained through training in the method in this disclosure is higher. For another example, when the neural network is used for image segmentation, accuracy of segmentation performed by the neural network obtained through training in the method in this disclosure is higher. For another example, when the neural network is used for target object detection, accuracy of detection performed by the neural network obtained through training in the method in this disclosure is higher.

In some possible implementations, the neural network is a recurrent neural network, and the first target layer includes a long short-term memory unit, a bidirectional recurrent neural network unit, a memory network unit, or a gate recurrent unit. In this case, if the neural network is used for language translation, accuracy of translation performed by the neural network obtained through training in this disclosure is higher, and if the neural network is used for sentence repeating, accuracy of a sentence repeated by the neural network obtained through training in this disclosure is higher.

According to a second aspect, this disclosure provides a neural network training method. The method includes inputting training data into a convolutional neural network, where the training data includes an image, determining a first input space of a second target layer in the convolutional neural network based on a first output space of a first target layer in the convolutional neural network, where the first target layer is a convolutional layer or a fully connected layer, and inputting a feature vector in the first input space into the second target layer, to train the convolutional neural network, where a capability of fitting random noise by using an output space that is of a third target layer in the convolutional neural network and that exists when the feature vector in the first input space is input into the second target layer is lower than a capability of fitting the random noise by using an output space that is of the third target layer and that exists when a feature vector in the first output space is input into the second target layer.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In some possible implementations, the second target layer is a $1^{st}$ layer after the first target layer, and the third target layer and the second target layer are a same layer.

In some possible implementations, determining a first input space of a second target layer in the convolutional neural network based on a first output space of a first target layer in the convolutional neural network includes: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In some possible implementations, determining the first input space based on the target perturbation value and the first output space includes determining a target function value of the target function based on the target perturbation value, the first output space, and the weight matrix of the second target layer, and when a difference between the target function value and an initial function value is less than or equal to a preset threshold, performing perturbation adjustment on the first output space based on the target perturbation value, and determining that an output space obtained through adjustment is the first input space, or when a difference between the target function value and an initial function value is greater than a preset threshold, updating the initial function value to the target function value, updating the initial perturbation value to the target perturbation value, and repeatedly performing step 1 to step 3.

In some possible implementations, the target function further includes a regular term of the perturbation value of the first output space.

In some possible implementations, an expression of the target function is as follows:

$$\frac{1}{N}\left[\sup_k \left|\left\langle K'[k,:], \sum_{i=1}^N \sigma_i [f(x_i) - m_i \circ \varepsilon_i] \right\rangle\right|\right] + \frac{\lambda}{2}\sum_{i=1}^N \|\varepsilon_i\|_2^2,$$

where $\sigma_i$ is $-1$ or $1$, $K'[k,:]$ represents a $k^{th}$ row in the weight matrix of the second target layer, "$\langle,\rangle$" represents pointwise multiplication, $$\sup_k \left|\left\langle K'[k,:]^T, \sum_{i=1}^N \sigma_i[f(x_i) - m_i \circ \varepsilon_i] \right\rangle\right|$$

represents that k in $$\sup_k \left|\left\langle K'[k,:]^T, \sum_{i=1}^N \sigma_i[f(x_i) - m_i \circ \varepsilon_i] \right\rangle\right|$$

is used to maximize a value of $$\left|\left\langle K'[k,:]^T, \sum_{i=1}^N \sigma_i[f(x_i) - m_i \circ \varepsilon_i] \right\rangle\right|,$$

"$\|\ \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "$\circ$" represents element-wise multiplication, a length of $m_i$ is the same as a length of $f(x_i)$, a value of each element in $m_i$ is 0 or 1, $\varepsilon_i$ indicates the perturbation value of the first output space, and $\Delta$ is a preconfigured parameter value.

In some possible implementations, the first output space, the perturbation value of the first output space, and the first input space satisfy the following relationship:

$$\hat{f}(x_i) = f(x_i) - m_i \circ \varepsilon_i,$$

where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "$\circ$" represents element-wise multiplication, $\hat{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

It can be understood that the training data input into the convolutional neural network may alternatively be speech or text. When the training data of the convolutional neural network is speech or text, a method for training the convolutional neural network is similar to the training method in the second aspect. Details are not described herein again.

According to a third aspect, this disclosure provides a neural network training method. The method includes inputting training data into a recurrent neural network, where the training data includes text or speech, determining a first input space of a second target layer in the recurrent neural network based on a first output space of a first target layer in the recurrent neural network, where the first target layer includes a long short-term memory unit, a bidirectional recurrent neural network unit, a memory network unit, or a gate recurrent unit, and inputting a feature vector in the first input space into the second target layer, to train the recurrent neural network, where a capability of fitting random noise by using an output space that is of a third target layer in the recurrent neural network and that exists when the feature vector in the first input space is input into the second target layer is lower than a capability of fitting the random noise by using an output space that is of the third target layer and that exists when a feature vector in the first output space is input into the second target layer.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In some possible implementations, the second target layer is a $1^{st}$ layer after the first target layer, and the third target layer and the second target layer are a same layer.

In some possible implementations, determining a first input space of a second target layer in the recurrent neural network based on a first output space of a first target layer in the recurrent neural network includes: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In some possible implementations, determining the first input space based on the target perturbation value and the first output space includes determining a target function value of the target function based on the target perturbation value, the first output space, and the weight matrix of the second target layer, and when a difference between the target function value and an initial function value is less than or equal to a preset threshold, performing perturbation adjustment on the first output space based on the target perturbation value, and determining that an output space obtained through adjustment is the first input space, or when a difference between the target function value and an initial function value is greater than a preset threshold, updating the initial function value to the target function value, updating the initial perturbation value to the target perturbation value, and repeatedly performing step 1 to step 3.

In some possible implementations, the target function further includes a regular term of the perturbation value of the first output space.

In some possible implementations, an expression of the target function is as follows:

$$\frac{1}{N}\left[\sup_{k}\left|\left\langle K'[k,:], \sum_{i=1}^{N} \sigma_i \, [f(x_i) - m_i \circ \varepsilon_i]\right\rangle\right| + \frac{\lambda}{2}\sum_{i=1}^{N}\|\varepsilon_i\|_2^2\right],$$

where $\sigma_i$ is $-1$ or $1$, $K'[k,:]$ represents a $k^{th}$ row in the weight matrix of the second target layer, "$\langle , \rangle$" represents point-wise multiplication, $$\sup_{k}\left|\left\langle K'[k,:]^T, \sum_{i=1}^{N} \sigma_i[f(x_i) - m_i \circ \varepsilon_i]\right\rangle\right|$$

represents that k in $$\sup_{k}\left|\left\langle K'[k,:]^T, \sum_{i=1}^{N} \sigma_i[f(x_i) - m_i \circ \varepsilon_i]\right\rangle\right|$$

is used to maximize a value of $$\left|\left\langle K'[k,:]^T, \sum_{i=1}^{N} \sigma_i[f(x_i) - m_i \circ \varepsilon_i]\right\rangle\right|,$$

"$\|\ \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "$\circ$" represents element-wise multiplication, a length of $m_i$ is the same as a length of $f(x_i)$, a value of each element in $m_i$ is 0 or 1, $\varepsilon_i$ indicates the perturbation value of the first output space, and $\lambda$ is a preconfigured parameter value.

In some possible implementations, the first output space, the perturbation value of the first output space, and the first input space satisfy the following relationship:

$\hat{f}(x_i) = f(x_i) - m_i \circ \varepsilon_i,$ where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "$\circ$" represents element-wise multiplication, $\hat{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

It can be understood that the training data input into the recurrent neural network may alternatively be an image. When the training data of the recurrent neural network is an image, a method for training the recurrent neural network is similar to the training method in the third aspect. Details are not described herein again.

According to a fourth aspect, this disclosure provides a neural network training apparatus. The apparatus includes an input module configured to input training data into a neural network, where the training data includes an image, text, or speech, a determining module configured to determine a first input space of a second target layer in the neural network based on a first output space of a first target layer in the neural network, where the second target layer is a $1^{st}$ layer after the first target layer, and a training module configured to input a feature vector in the first input space into the second target layer, to train the neural network, where a capability of fitting random noise by using an output space that is of a third target layer in the neural network and that exists when the feature vector in the first input space is input into the second target layer is lower than a capability of fitting the random noise by using an output space that is of the third target layer and that exists when a feature vector in the first output space is input into the second target layer, and the third target layer is a layer after the first target layer.

In the apparatus, after the first target layer outputs the first output space, the feature vector in the first output space is not directly input into the second target layer. Instead, the first output space is processed, and a feature vector in a first input space obtained through processing is input into the second target layer, to continue to train the neural network. In addition, in comparison with the first output space existing before processing, after the first input space obtained through processing is input into the second target layer, a capability of fitting noise by using the output space of the third target layer may be lowered, in other words, a capability of fitting noise in the neural network may be lowered. Therefore, an overfitting phenomenon that occurs in the neural network can be avoided, and a generalization capability of the neural network can be improved, to finally help improve performance that exists when the neural network processes an image, text, or speech, for example, accuracy of a prediction result.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In this implementation, in comparison with the first output space, after the first input space determined based on the first output space is input into the second target layer, Rademacher complexity of the output space of the third target layer can be reduced. Because the capability of fitting noise by using the output space of the third target layer is also reduced correspondingly after the Rademacher complexity of the output space of the third target layer is reduced, an overfitting phenomenon that occurs in the neural network can be avoided, and a generalization capability of the neural network can be improved, to finally help improve performance that exists when the neural network processes new data.

The neural network trained in the apparatus may be a DNN, and the third target layer may be the second target layer, or may be another layer after the second target layer.

In some possible implementations, the determining module is further configured to perform the following steps: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In this implementation, because the target function includes the first relational expression for calculating the Rademacher complexity of the second target layer, the gradient of the target function is obtained, the gradient is determined as the perturbation value increment, the target perturbation value is determined based on the perturbation value increment, and perturbation processing is performed on the first output space based on the target perturbation value, to obtain the first input space, so that after the feature vector in the first input space is input into the second target layer, Rademacher complexity of an output space corresponding to the second target layer greatly decreases. Therefore, a capability of fitting noise by using the output space of the second target layer can be greatly reduced, and training efficiency can be improved.

In some possible implementations, the determining module is further configured to determine a target function value of the target function based on the target perturbation value, the first output space, and the weight matrix of the second target layer, and when a difference between the target function value and an initial function value is less than or equal to a preset threshold, perform perturbation adjustment on the first output space based on the target perturbation value, and determine that an output space obtained through adjustment is the first input space, or when a difference between the target function value and an initial function value is greater than a preset threshold, update the initial function value to the target function value, update the initial perturbation value to the target perturbation value, and repeatedly perform step 1 to step 3.

In this implementation, step 1 to step 3 are repeatedly performed until the target function converges, a corresponding target perturbation value existing when the target function converges is used as a final perturbation value, the first output space is adjusted based on the final perturbation value, and the output space obtained through adjustment is used as the first input space. In this way, after the first input space is input into the second target layer, an overfitting phenomenon existing in the neural network can be better avoided based on a capability of fitting noise by using an output space of the second target layer.

Optionally, in some possible implementations, when the determining module determines the first input space based on the target perturbation value and the first output space, perturbation processing may be directly performed on the first output space based on the target perturbation value, and an output space obtained through processing is used as the first input space.

Optionally, in some possible implementations, when the determining module determines the first input space based on the target perturbation value and the first output space, the determining module may determine, based on a difference between perturbation value increments in two iteration processes, whether to stop iteration. For example, the iteration is stopped when the difference between perturbation value increments in two adjacent iteration processes is less than or equal to a preset threshold.

In some possible implementations, the target function further includes a regular term of the perturbation value of the first output space.

In other words, in addition to the first relational expression for calculating the Rademacher complexity of the second target layer, the target function further includes the regular term of the perturbation value of the first output space. In this way, a magnitude of a perturbation value increment obtained through calculation each time may be constrained, to constrain a value of a target perturbation value obtained through calculation each time, so that Rademacher complexity of an output space corresponding to the second target layer can be prevented from being too small, and a loss on an expression capability of the neural network can be prevented from being too large, to finally help guarantee performance of the neural network.

Optionally, in some possible implementations, the target function includes another regular term of the perturbation value of the first output space. For example, the regular term may be a relational expression of an average value of the perturbation value of the first output space.

For example, when the neural network includes a classification network, in the foregoing several implementations, a classification precision difference between a test set and a training set can be narrowed without obviously reducing classification precision, to improve performance of the neural network.

In some possible implementations, an expression of the target function is as follows:

$$\frac{1}{N}\left[\sup_k \left|\left\langle K'[k,:], \sum_{i=1}^{N} \sigma_i \left[f(x_i) - m_i \circ \varepsilon_i\right]\right\rangle\right|\right] + \frac{\lambda}{2}\sum_{i=1}^{N}\|\varepsilon_i\|_2^2,$$

where $\sigma_i$ is $-1$ or $1$, $K'[k,:]$ represents a $k^{th}$ row in the weight matrix of the second target layer, "$\langle , \rangle$" represents pointwise multiplication, $$\sup_k \left|\left\langle K'[k,:]^T, \sum_{i=1}^{N} \sigma_i [f(x_i) - m_i \circ \varepsilon_i]\right\rangle\right|$$

represents that k in $$\sup_k \left|\left\langle K'[k, :]^T, \sum_{i=1}^{N} \sigma_i [f(x_i) - m_i \circ \varepsilon_i]\right\rangle\right|$$

is used to maximize a value of $$\left|\left\langle K'[k, :]^T, \sum_{i=1}^{N} \sigma_i [f(x_i) - m_i \circ \varepsilon_i]\right\rangle\right|,$$

"$\| \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "∘" represents element-wise multiplication, a length of $m_i$ is the same as a length of $f(x_i)$, a value of each element in $m_i$ is 0 or 1, $\varepsilon_i$ indicates the perturbation value of the first output space, and λ is a preconfigured parameter value.

In some possible implementations, the first output space, the perturbation value of the first output space, and the first input space satisfy the following relationship:

$$\hat{f}(x_i)=f(x_i)-m_i\circ\varepsilon_i,$$

where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "∘" represents element-wise multiplication, $\hat{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

For example, the first input space may be calculated based on the first output space and the target perturbation value by using the relational expression.

In the first aspect, the first target layer may be any one of a first layer to a penultimate layer in the neural network. During training of the neural network, processing in the foregoing implementations may be performed for any one or more layers of the first layer to the penultimate layer in the neural network.

In some possible implementations, the neural network is a convolutional neural network, and the first target layer is a convolutional layer or a fully connected layer. In this case, when a convolutional neural network obtained through training in the method in this disclosure is used to process a new image, text, or speech, better processing performance can be obtained. For example, when the neural network is used for image classification, accuracy of classification performed by the neural network obtained through training in the method in this disclosure is higher. For another example, when the neural network is used for image segmentation, accuracy of segmentation performed by the neural network obtained through training in the method in this disclosure is higher. For another example, when the neural network is used for target object detection, accuracy of detection performed by the neural network obtained through training in the method in this disclosure is higher.

In some possible implementations, the neural network is a recurrent neural network, and the first target layer includes a long short-term memory unit, a bidirectional recurrent neural network unit, a memory network unit, or a gate recurrent unit. In this case, when a recurrent neural network obtained through training in the method in this disclosure is used to process a new image, text, or speech, better processing performance can be obtained. For example, if the recurrent neural network is used for language translation, accuracy of translation performed by the recurrent neural network obtained through training in this disclosure is higher, and if the recurrent neural network is used for sentence repeating, accuracy of a sentence repeated by the recurrent neural network obtained through training in this disclosure is higher.

According to a fifth aspect, this disclosure provides a neural network training apparatus. The apparatus includes an input module configured to input training data into a convolutional neural network, where the training data includes an image, a determining module configured to determine a first input space of a second target layer in the convolutional neural network based on a first output space of a first target layer in the convolutional neural network, where the first target layer is a convolutional layer or a fully connected layer, and a training module configured to input a feature vector in the first input space into the second target layer, to train the convolutional neural network, where a capability of fitting random noise by using an output space that is of a third target layer in the convolutional neural network and that exists when the feature vector in the first input space is input into the second target layer is lower than a capability of fitting the random noise by using an output space that is of the third target layer and that exists when a feature vector in the first output space is input into the second target layer.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In some possible implementations, the second target layer is a $1^{st}$ layer after the first target layer, and the third target layer and the second target layer are a same layer.

In some possible implementations, the determining module is further configured to perform the following steps: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In some possible implementations, the determining module is further configured to determine a target function value of the target function based on the target perturbation value, the first output space, and the weight matrix of the second target layer, and when a difference between the target function value and an initial function value is less than or equal to a preset threshold, perform perturbation adjustment on the first output space based on the target perturbation value, and determine that an output space obtained through adjustment is the first input space, or when a difference between the target function value and an initial function value is greater than a preset threshold, update the initial function value to the target function value, update the initial perturbation value to the target perturbation value, and repeatedly perform step 1 to step 3.

In some possible implementations, the target function further includes a regular term of the perturbation value of the first output space.

In some possible implementations, an expression of the target function is as follows:

$$\frac{1}{N}\left[\sup_k \left|\left\langle K'[k,:], \sum_{i=1}^N \sigma_i[f(x_i) - m_i \circ \varepsilon_i]\right\rangle\right| + \frac{\lambda}{2}\sum_{i=1}^N \|\varepsilon_i\|_2^2\right],$$

where $\sigma_i$ is −1 or 1, K'[k,:] represents a $k^{th}$ row in the weight matrix of the second target layer, "$\langle,\rangle$" represents pointwise multiplication, $$\sup_k \left|\left\langle K'[k,:]^T, \sum_{i=1}^N \sigma_i[f(x_i) - m_i \circ \varepsilon_i]\right\rangle\right|$$

represents that k in $$\sup_k \left|\left\langle K'[k,:]^T, \sum_{i=1}^N \sigma_i[f(x_i) - m_i \circ \varepsilon_i]\right\rangle\right|$$

is used to maximize a value of $$\left|\left\langle K'[k,:]^T, \sum_{i=1}^N \sigma_i[f(x_i) - m_i \circ \varepsilon_i]\right\rangle\right|,$$

"$\| \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "$\circ$" represents element-wise multiplication, a length of $m_i$ is the same as a length of $f(x_i)$, a value of each element in $m_i$ is 0 or 1, $\varepsilon_i$ indicates the perturbation value of the first output space, and $\lambda$ is a preconfigured parameter value.

In some possible implementations, the first output space, the perturbation value of the first output space, and the first input space satisfy the following relationship:

$$\hat{f}(x_i)=f(x_i)-m_i \circ \varepsilon_i,$$

where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "$\circ$" represents element-wise multiplication, $\hat{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

It can be understood that the training data input into the convolutional neural network may alternatively be speech or text. When the training data of the convolutional neural network is speech or text, a structure of the training apparatus for the convolutional neural network is similar to a structure of the training apparatus in the fourth aspect. Details are not described herein again.

According to a sixth aspect, this disclosure provides a neural network training apparatus. The apparatus includes an input module configured to input training data into a recurrent neural network, where the training data includes text or speech, a determining module configured to determine a first input space of a second target layer in the recurrent neural network based on a first output space of a first target layer in the recurrent neural network, where the first target layer includes a long short-term memory unit, a bidirectional recurrent neural network unit, a memory network unit, or a gate recurrent unit, and a training module configured to input a feature vector in the first input space into the second target layer, to train the recurrent neural network, where a capability of fitting random noise by using an output space that is of a third target layer in the recurrent neural network and that exists when the feature vector in the first input space is input into the second target layer is lower than a capability of fitting the random noise by using an output space that is of the third target layer and that exists when a feature vector in the first output space is input into the second target layer.

In some possible implementations, first Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

In some possible implementations, the second target layer is a $1^{st}$ layer after the first target layer, and the third target layer and the second target layer are a same layer.

In some possible implementations, the determining module is further configured to perform the following steps: step 1: determine a perturbation value increment of the first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on an input space of the second target layer and the weight matrix of the second target layer, the first relational expression includes a relational expression for determining the input space of the second target layer based on the perturbation value of the first output space and the first output space, and the perturbation value increment is a gradient of the target function, step 2: determine a target perturbation value of the first output space based on the initial perturbation value and the perturbation value increment, and step 3: determine the first input space based on the target perturbation value and the first output space.

In some possible implementations, the determining module is further configured to determine a target function value of the target function based on the target perturbation value, the first output space, and the weight matrix of the second target layer, and when a difference between the target function value and an initial function value is less than or equal to a preset threshold, perform perturbation adjustment on the first output space based on the target perturbation value, and determine that an output space obtained through adjustment is the first input space, or when a difference between the target function value and an initial function value is greater than a preset threshold, update the initial function value to the target function value, update the initial perturbation value to the target perturbation value, and repeatedly perform step 1 to step 3.

In some possible implementations, the target function further includes a regular term of the perturbation value of the first output space.

In some possible implementations, an expression of the target function is as follows:

$$\frac{1}{N}\left[\sup_k\left|\left\langle K'[k,:],\sum_{i=1}^N\sigma_i[f(x_i)-m_i\circ\varepsilon_i]\right\rangle\right|+\frac{\lambda}{2}\sum_{i=1}^N\|\varepsilon_i\|_2^2\right],$$

where $\sigma_i$ is −1 or 1, K'[k,:] represents a $k^{th}$ row in the weight matrix of the second target layer, "$\langle,\rangle$" represents point-wise multiplication, $$\sup_k\left|\left\langle K'[k,:]^T,\sum_{i=1}^N\sigma_i[f(x_i)-m_i\circ\varepsilon_i]\right\rangle\right|$$

represents that k in $$\sup_k\left|\left\langle K'[k,:]^T,\sum_{i=1}^N\sigma_i[f(x_i)-m_i\circ\varepsilon_i]\right\rangle\right|$$

is used to maximize a value of $$\left|\left\langle K'[k,:]^T,\sum_{i=1}^N\sigma_i[f(x_i)-m_i\circ\varepsilon_i]\right\rangle\right|,$$

"$\|\ \|_2$" represents a quadratic norm, $f(x_i)$ represents an $i^{th}$ output space in the first output space, the $i^{th}$ output space is an output space corresponding to $i^{th}$ data in the training data, i is a positive integer less than or equal to N, N is an amount of the training data, "∘" represents element-wise multiplication, a length of $m_i$ is the same as a length of $f(x_i)$, a value of each element in $m_i$ is 0 or 1, $\varepsilon_i$ indicates the perturbation value of the first output space, and λ is a preconfigured parameter value.

In some possible implementations, the first output space, the perturbation value of the first output space, and the first input space satisfy the following relationship:

$\hat{f}(x_i)=f(x_i)-m_i\circ\varepsilon_i,$ where $f(x_i)$ represents the $i^{th}$ output space in the first output space, the $i^{th}$ output space is the output space corresponding to the $i^{th}$ data in the training data, i is a positive integer less than or equal to N, N is the amount of the training data, "∘" represents element-wise multiplication, $\hat{f}(x_i)$ represents an $i^{th}$ input space obtained by performing perturbation adjustment on the $i^{th}$ output space, a size of $m_i$ is the same as a size of $f(x_i)$, the value of each element in $m_i$ is 0 or 1, and $\varepsilon_i$ represents the perturbation value of the target first output space.

It can be understood that the training data input into the recurrent neural network may alternatively be an image. When the training data of the recurrent neural network is an image, a structure of the training apparatus for the recurrent neural network is similar to a structure of the training apparatus in the sixth aspect. Details are not described herein again.

According to a seventh aspect, this disclosure provides a neural network training apparatus. The apparatus includes a memory configured to store a program, a processor configured to execute the program stored in the memory, and when the program stored in the memory is executed, the processor is configured to perform the method in the first aspect.

According to an eighth aspect, this disclosure provides a neural network training apparatus. The apparatus includes a memory configured to store a program, a processor configured to execute the program stored in the memory, and when the program stored in the memory is executed, the processor is configured to perform the method in the second aspect.

According to a ninth aspect, this disclosure provides a neural network training apparatus. The apparatus includes a memory configured to store a program, a processor configured to execute the program stored in the memory, and when the program stored in the memory is executed, the processor is configured to perform the method in the third aspect.

According to a tenth aspect, this disclosure provides a computer-readable medium. The computer-readable medium stores instructions to be executed by a device, and the instructions are used to implement the method in the first aspect.

According to an eleventh aspect, this disclosure provides a computer-readable medium. The computer-readable medium stores instructions to be executed by a device, and the instructions are used to implement the method in the second aspect.

According to a twelfth aspect, this disclosure provides a computer-readable medium. The computer-readable medium stores instructions to be executed by a device, and the instructions are used to implement the method in the third aspect.

According to a thirteenth aspect, this disclosure provides a computer program product including instructions. When the computer program product runs on a computer, the computer is enabled to perform the method in the first aspect.

According to a fourteenth aspect, this disclosure provides a computer program product including instructions. When the computer program product runs on a computer, the computer is enabled to perform the method in the second aspect.

According to a fifteenth aspect, this disclosure provides a computer program product including instructions. When the computer program product runs on a computer, the computer is enabled to perform the method in the third aspect.

According to a sixteenth aspect, this disclosure provides a chip. The chip includes a processor and a data interface, and the processor reads, through the data interface, instructions stored in a memory, to perform the method in the first aspect.

Optionally, in an implementation, the chip may further include the memory, and the memory stores the instruction. The processor is configured to execute the instruction stored in the memory, and when the instruction is executed, the processor is configured to perform the method according to the first aspect.

According to a seventeenth aspect, this disclosure provides a chip. The chip includes a processor and a data interface, and the processor reads, through the data interface, instructions stored in a memory, to perform the method in the second aspect.

Optionally, in an implementation, the chip may further include the memory, and the memory stores the instruction. The processor is configured to execute the instruction stored in the memory, and when the instruction is executed, the processor is configured to perform the method according to the second aspect.

According to an eighteenth aspect, this disclosure provides a chip. The chip includes a processor and a data interface, and the processor reads, through the data interface, instructions stored in a memory, to perform the method in the third aspect.

Optionally, in an implementation, the chip may further include the memory, and the memory stores the instruction. The processor is configured to execute the instruction stored in the memory, and when the instruction is executed, the processor is configured to perform the method according to the third aspect.

According to a nineteenth aspect, this disclosure provides a computing device. The computing device includes a processor and a memory, the memory stores computer instructions, and the processor executes the computer instructions, to implement the method in the first aspect.

According to a twentieth aspect, this disclosure provides a computing device. The computing device includes a processor and a memory, the memory stores computer instructions, and the processor executes the computer instructions, to implement the method in the second aspect.

According to a twenty-first aspect, this disclosure provides a computing device. The computing device includes a processor and a memory, the memory stores computer instructions, and the processor executes the computer instructions, to implement the method in the third aspect.

DESCRIPTION OF EMBODIMENTS

The following describes technical solutions in embodiments of this disclosure with reference to the accompanying drawings in embodiments of this disclosure. It is clear that the described embodiments are merely a part rather than all of embodiments of this disclosure. All other embodiments obtained by a person of ordinary skill in the art based on embodiments of this disclosure without creative efforts shall fall within the protection scope of this disclosure.

Figure 1:
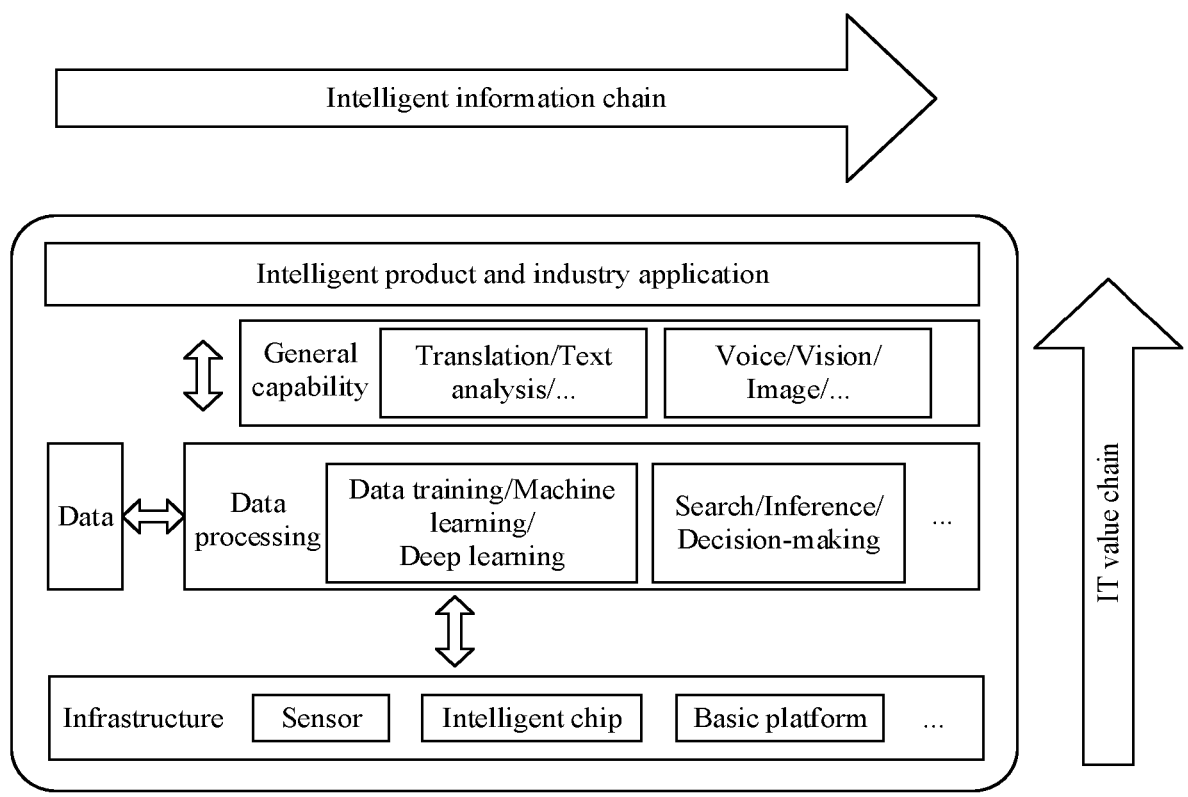
FIG. 1 is a schematic diagram of an AI main framework according to an embodiment of this disclosure.

FIG. 1 is a schematic diagram of an AI main framework. The main framework describes an overall working procedure of an AI system, and is applicable to a requirement of a general AI field.

The following describes in detail the foregoing AI main framework from two dimensions: an "intelligent information chain" (a horizontal axis) and an "information technology (IT) value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by AI to the information technology industry from an underlying infrastructure and information (technology providing and processing implementation) of human intelligence to an industrial ecological process of a system.

(1) Infrastructure:

The infrastructure provides calculation capability support for the AI system, communicates with an external world, and implements support by using a basic platform.

The infrastructure can communicate with the outside by using a sensor, and a calculation capability of the infrastructure can be provided by an intelligent chip.

The intelligent chip herein may be a hardware acceleration chip such as a central processing unit (CPU), a neural-network processing unit (NPU), a graphics processing unit (GPU), an application-specific integrated circuit (ASIC), or a field-programmable gate array (FPGA).

The basic platform of the infrastructure may include related platforms assurance and support such as a distributed computing framework and a network, and may include cloud storage and computing, an interconnection and interworking network, and the like.

For example, the infrastructure can communicate with the outside by using the sensor, to obtain data. Then, the data is provided to an intelligent chip in a distributed computing system provided by the basic platform, for computing.

(2) Data:

Data from a higher layer of the infrastructure is used to indicate a data source in the AI field. The data relates to a graph, an image, speech, and text, further relates to internet of things data of a conventional device, and includes service data of an existing system and perception data such as force, displacement, a liquid level, a temperature, and humidity.

(3) Data Processing:

The foregoing data processing usually includes a processing manner such as data training, machine learning, deep learning, search, inference, or decision-making.

In machine learning and deep learning, intelligent information of the data may be modeled, extracted, preprocessed, trained, or the like in a symbolized and formalized manner.

Inference is a process of simulating intelligent human inference methods in computers or intelligent systems and using, based on an inference control policy, formalized information to carry out machine thinking and resolve problems, and typical functions are search and matching.

Decision-making is a process of making a decision after intelligent information inference, and usually provides functions such as classification, ranking, and prediction.

(4) General Capability:

After data processing mentioned above is performed on data, some general capabilities may be further formed based on a data processing result, for example, an algorithm or a general system, such as translation, text analysis, computer vision processing, speech recognition, and image recognition.

(5) Smart Product and Industry Application:

Smart products and industry applications are products and applications of the AI system in various fields, and are package of an overall solution of the AI. Decision-making for intelligent information is productized and an application is implemented. Application fields mainly include intelligent manufacturing, intelligent transportation, smart home, smart healthcare, smart security, automated driving, a safe city, an intelligent terminal, and the like.

The solution in this disclosure may be applied to many fields in AI, for example, fields to which a neural network needs to be applied, for example, an intelligent terminal, intelligent manufacturing, intelligent transportation, smart home, smart healthcare, smart security, automated driving, and a safe city. The following briefly describes three common application scenarios.

Application Scenario 1: Driver Assistance/Automated Driving System:

A neural network used to detect a target is obtained through training in a training method in an embodiment of this disclosure, and the neural network is applied to an advanced driver assistant system (ADAS) and an automated driving system (ADS), to process an input road image, to recognize different objects in the road image, so as to further detect and evade a pedestrian or an obstacle on a road surface, especially to avoid colliding with the pedestrian.

Application Scenario 2: Safe City/Video Surveillance System:

A neural network used to detect a target is obtained through training in a training method in an embodiment of this disclosure, and the neural network is applied to a safe city system and a video surveillance system, to detect the target (detect a pedestrian or a vehicle) in real time, mark a detection result, and send the detection result to an analysis unit of the system, to search for a suspect, a missing person, a specific vehicle, or the like.

Application Scenario 3: Intelligent Terminal (Album Classification and Object Recognition from an Image)

A neural network used for album classification is obtained through training in a training method in an embodiment of this disclosure, and then the neural network is used to classify pictures on an intelligent terminal (for example, a smartphone or a tablet computer), to label different categories of pictures, and facilitate viewing and searching by a user. In addition, classification labels of the images may also be provided for an album management system to perform classification management. This saves management time of the user, improves album management efficiency, and improves user experience.

Embodiments of this disclosure relate to applications related to a neural network. To better understand the solutions in embodiments of this disclosure, the following first describes related terms and other related concepts of the neural network that may be involved in embodiments of this disclosure.

(1) Convolutional Neural Network (CNN)

The convolutional neural network is a DNN with a convolutional structure. The convolutional neural network includes a feature extractor including a convolutional layer and a sub sampling layer. The feature extractor may be considered as a filter. A convolution process may be considered as performing convolution by using a trainable filter and an input image or a convolution feature map. The convolutional layer is a neuron layer that performs convolution processing on an input signal that is in the convolutional neural network. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing the weight may be understood as that a manner of extracting image information is unrelated to a position. A principle implied herein is that statistical information of a part of an image is the same as that of another part. To be specific, image information that is learned in a part can also be used in another part. Therefore, image information obtained through same learning can be used for all locations in the image. At a same convolutional layer, a plurality of convolution kernels may be used for extracting different image information. Usually, a larger quantity of convolution kernels indicates richer image information reflected by a convolution operation.

The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(2) Back Propagation Algorithm:

The convolutional neural network may correct a value of a parameter in an initial super-resolution model in a training process according to an error back propagation (BP) algorithm, so that an error loss of reconstructing the super-resolution model becomes smaller. Further, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(3) Loss Function:

In a process of training a DNN, because it is expected that an output of the DNN is as close as possible to a value that is actually expected to be predicted, a predicted value of a current network and a target value that is actually expected may be compared, and then, a weight vector of each layer of the neural network is updated based on a difference between the predicted value and the target value (certainly, there is usually an initialization process before the first update, that is, a parameter is preconfigured for each layer in the DNN). For example, if the predicted value of the network is higher, the weight vector is adjusted to obtain a lower predicted value. The weight vector is continuously adjusted until the DNN can predict the target value that is actually expected or a value that is very close to the target value that is actually expected. Therefore, "how to obtain, through comparison, a difference between the predicted value and the target value" needs to be predefined. This is a loss function or an objective function. The loss function and the objective function are important equations used to measure the difference between the predicted value and the target value. The loss function is used as an example. A higher output value (loss) of the loss function indicates a larger difference. Therefore, training of the DNN becomes a process of reducing the loss as much as possible.

(4) Recurrent Neural Network (RNN):

The RNN is used to process sequence data. In a conventional neural network model, from an input layer to a hidden layer and then to an output layer, the layers are fully connected, but nodes in each layer are not connected. This common neural network resolves many problems, but is still incompetent to resolve many other problems. For example, to predict a next word in a sentence, a previous word usually needs to be used, because adjacent words in the sentence are not independent. A reason why the RNN is referred to as a recurrent neural network is that a current output of a sequence is related to a previous output. A specific representation form is that the network memorizes previous information and applies the previous information to calculation of the current output. To be specific, nodes in the hidden layer are no longer unconnected, but are connected, and an input for the hidden layer includes not only an output of the input layer but also an output of the hidden layer at a previous moment. Theoretically, the RNN can process sequence data of any length. Training of the RNN is the same as training of a conventional CNN or DNN.

A reason why the recurrent neural network is required when there is a convolutional neural network is simple. In the convolutional neural network, there is a premise that elements are independent of each other, and input and output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference based on content of a context, but how can a machine do this? The RNN emerges. The RNN is designed to enable a machine to have a capability to remember like human beings. Therefore, an output of the RNN depends on current input information and historical memory information.

Figure 2:
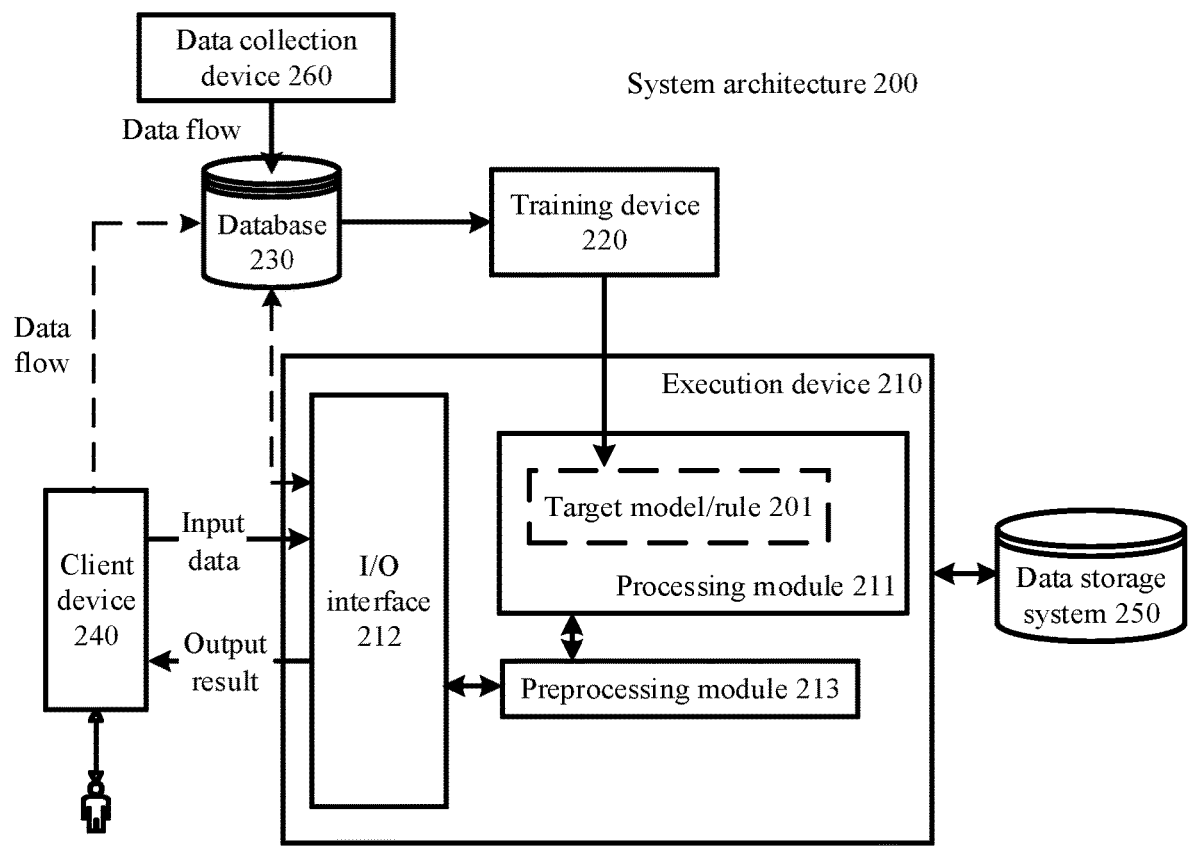
FIG. 2 is a schematic diagram of a structure of a system architecture according to an embodiment of this disclosure.

FIG. 2 shows a system architecture 200 according to an embodiment of this disclosure. In FIG. 2, a data collection device 260 is configured to collect training data. A target model/rule 201 used for image processing is used as an example. The training data may include a training image and a classification result corresponding to the training image. A result of the training image may be a result obtained through manual pre-labeling.

After collecting the training data, the data collection device 260 stores the training data in a database 230, and a training device 220 obtains the target model/rule 201 through training based on the training data maintained in the database 230.

The following describes the target model/rule 201 obtained by the training device 220 based on the training data. The training device 220 processes an input raw image, and compares an output image with the raw image until a difference between the image output by the training device 120 and the raw image is less than a specific threshold. In this way, training of the target model/rule 201 is completed.

The target model/rule 201 can be used to implement a data processing method in an embodiment of this disclosure. The target model/rule 201 in this embodiment of this disclosure may further be a neural network. It should be noted that, in actual application, the training data maintained in the database 230 may not all be collected by the data collection device 260, or may be received and obtained from another device. It should be further noted that the training device 220 may not necessarily train the target model/rule 201 completely based on the training data maintained in the database 230, or may obtain training data from a cloud or another place to perform model training. The foregoing description should not be construed as a limitation on the embodiments of this disclosure.

The target model/rule 201 obtained through training by the training device 220 may be used in different systems or devices, for example, an execution device 210 shown in FIG. 2. The execution device 210 may be a terminal, for example, a mobile phone terminal, a tablet computer, a laptop computer, augmented reality (AR) AR/virtual reality (VR), or a vehicle-mounted terminal, or may be a server, a cloud, or the like. In FIG. 2, the execution device 210 configures an input/output (I/O) interface 212 configured to exchange data with an external device. A user may input data to the I/O interface 212 by using a client device 240, where the input data in this embodiment of this disclosure may include a to-be-processed image input by the client device.

A preprocessing module 213 and a preprocessing module 214 are configured to preprocess the input data (for example, the to-be-processed image) received by the I/O interface 212. In this embodiment of this disclosure, the preprocessing module 213 and the preprocessing module 214 may not exist (or there may be only one preprocessing module), and a calculation module 211 is directly used to process the input data.

In a process in which the execution device 210 performs preprocessing on the input data or a calculation module 211 of the execution device 210 performs related processing such as calculation, the execution device 210 may invoke data, code, and the like in a data storage system 250 for corresponding processing, and may also store data, instructions, and the like obtained through corresponding processing into the data storage system 250.

Finally, the I/O interface 212 returns a processing result, for example, the foregoing obtained image classification result, to the client device 240, so as to provide the image classification result to the user.

It should be noted that the training device 220 may generate corresponding target models/rules 201 for different targets or different tasks based on different training data. The corresponding target models/rules 201 may be used for implementing the foregoing targets or complete the foregoing tasks, to provide a desired result for the user.

In a case shown in FIG. 2, the user may manually give input data, and the manual giving may be performed in an interface provided by the I/O interface 212. In another case, the client device 240 may automatically send the input data to the I/O interface 212. If authorization needs to be obtained from the user to request the client device 240 to automatically send the input data, the user may set corresponding permission in the client device 240. The user may view, on the client device 240, a result output by the execution device 210, and a specific presentation form may be a specific manner such as display, sound, or action. The client device 240 may also serve as a data collection end to collect, as new sample data, the input data that is input into the I/O interface 212 and the output result that is output from the I/O interface 212 that are shown in the figure, and store the new sample data into the database 230. Certainly, the client device 240 may alternatively not perform collection, but the I/O interface 212 directly stores, as new sample data into the database 230, the input data that is input into the I/O interface 212 and the output result that is output from the I/O interface 212 that are shown in the figure.

It should be noted that FIG. 2 is only a schematic diagram of a system architecture according to an embodiment of this disclosure. A location relationship between a device, a component, a module, and the like illustrated in the figure, a type of the training data, and a type or a function of a neural network does not constitute any limitation. For example, in FIG. 2, the data storage system 250 is an external memory relative to the execution device 210. In another case, the data storage system 250 may alternatively be placed in the execution device 210. For another example, the training data may alternatively be text, speech, or another type of data.

As shown in FIG. 2, the training device 220 obtains the target model/rule 201 through training. In this embodiment of this disclosure, the target model/rule 201 may be the neural network in this disclosure. Further, the neural network trained in this embodiment of this disclosure may be a CNN, a deep CNN (DCNN), an RNN, or the like.

Because the CNN is a very common neural network, a structure of the CNN is described below in detail with reference to FIG. 3. As described in the foregoing description of basic concepts, the convolutional neural network is a DNN with a convolutional structure, and is a deep learning architecture. The deep learning architecture is to perform multi-level learning at different abstract levels by using a machine learning algorithm. As a deep learning architecture, the CNN is a feed-forward artificial neural network, and each neuron in the feed-forward artificial neural network can respond to an image input into the feed-forward artificial neural network.

Figure 3:
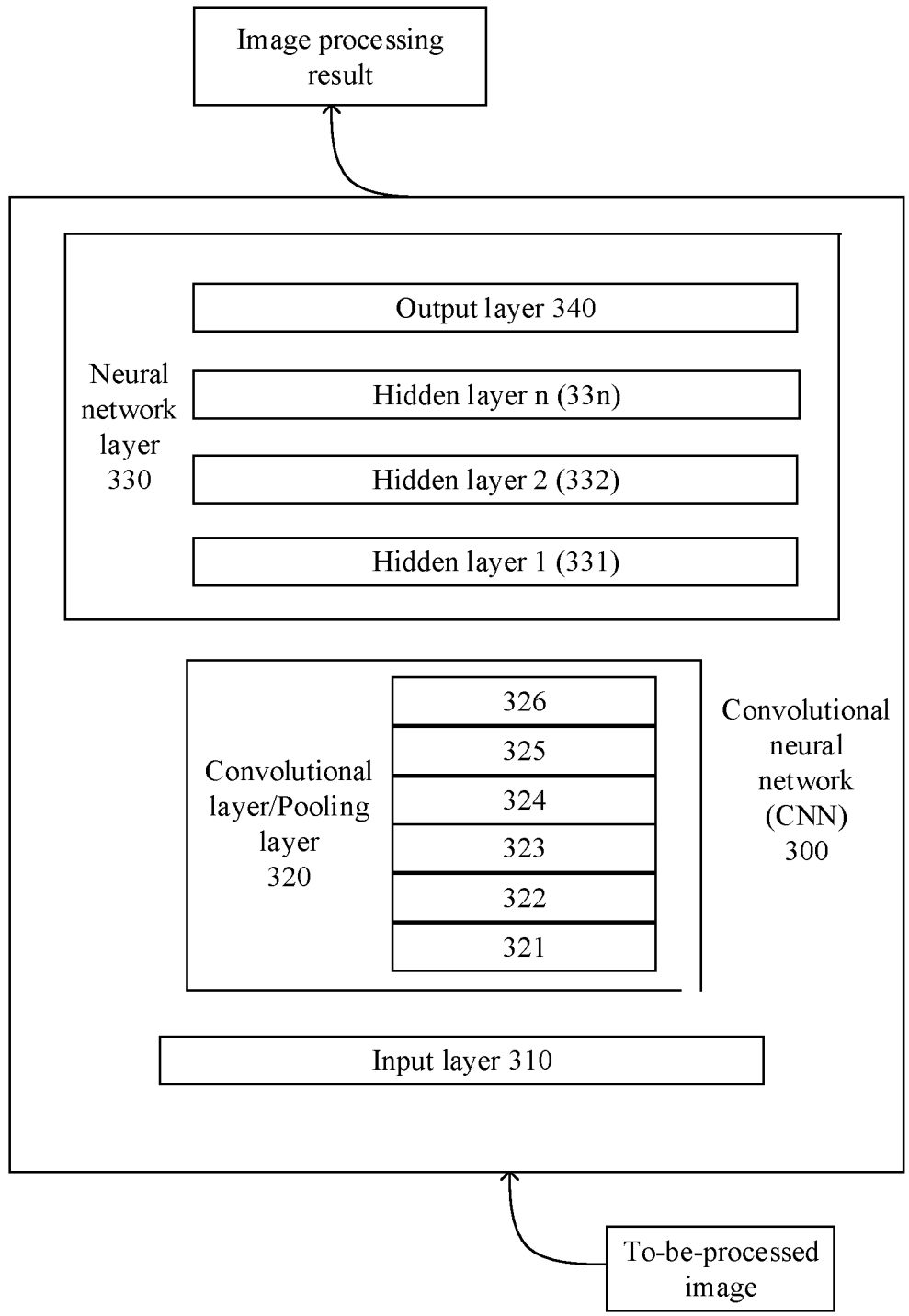
FIG. 3 is a schematic diagram of a structure of a convolutional neural network according to an embodiment of this disclosure.

The structure of the convolutional neural network in this embodiment of this disclosure may be shown in FIG. 3. In FIG. 3, a CNN 300 may include an input layer 310, a convolutional layer/pooling layer 320 (the pooling layer is optional), and a neural network layer 330.

Image processing is used as an example (which is similar to an operation performed when input data is text or speech). The input layer 310 may obtain a to-be-processed image, and send the obtained to-be-processed image to the convolution layer/pooling layer 320 and the neural network layer 330 for processing, to obtain an image processing result.

The following describes in detail an architecture of the layer in the CNN 300 in FIG. 3.

Convolutional Layer/Pooling Layer 320:

Convolutional Layer:

As shown in FIG. 3, for example, the convolutional layer/pooling layer 320 may include layers 321 to 326. For example, in an implementation, the layer 321 is a convolutional layer, the layer 322 is a pooling layer, the layer 323 is a convolutional layer, the layer 324 is a pooling layer, the layer 325 is a convolutional layer, and the layer 326 is a pooling layer. In another implementation, the layers 321 and 322 are convolutional layers, the layer 323 is a pooling layer, the layers 324 and 325 are convolutional layers, and the layer 326 is a pooling layer. In other words, output of a convolutional layer may be used as input for a subsequent pooling layer, or may be used as input for another convolutional layer, to continue to perform a convolution operation.

The following describes an internal operating principle of a convolution layer by using the convolution layer 321 as an example and by using an example in which the input data is an image. When the input data is speech, text, or another type of data, an internal operating principle of the convolution layer is similar.

The convolutional layer 321 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows× columns), namely, a plurality of same-type matrices, are applied. Outputs of the weight matrices are superimposed to form a depth dimension of a convolutional image. The dimension herein may be understood as being determined based on the foregoing "plurality". Different weight matrices may be used for extracting different features from the image. For example, one weight matrix is used for extracting edge information of the image, another weight matrix is used for extracting a specific color of the image, and a further weight matrix is used to blur unneeded noise in the image. The plurality of weight matrices has the same size (rows× columns), and convolutional feature maps extracted from the plurality of weight matrices with the same size have a same size. Then, the plurality of extracted convolutional feature maps with the same size are combined to form output of the convolution operation.

Weight values in these weight matrices need to be obtained through a lot of training during actual application. Each weight matrix formed by using the weight values obtained through training may be used for extracting information from an input image, to enable the convolutional neural network 200 to perform correct prediction.

When the convolutional neural network 300 has a plurality of convolutional layers, an initial convolutional layer (for example, 321) usually extracts a relatively large quantity of general features, and the general features may also be referred to as low-level features. As a depth of the convolutional neural network 300 increases, features extracted from a subsequent convolutional layer (for example, 326), for example, features such as high-level semantics, become more complex, and features with higher-level semantics are more applicable to a to-be-resolved problem.

Pooling Layer:

Because a quantity of training parameters often needs to be reduced, a pooling layer often needs to be periodically introduced after a convolutional layer. To be specific, the layers 321 to 326 shown in 320 in FIG. 3 may be as follows. One convolutional layer is followed by one pooling layer, or a plurality of convolutional layers are followed by one or more pooling layers. For example, in an image processing process, the pooling layer only aims to reduce a spatial size of the image. The pooling layer may include an average pooling operator and/or a maximum pooling operator, to perform sampling on the input image to obtain an image with a relatively small size. The average pooling operator may be used for calculating pixel values in the image in a specific range, to generate an average value. The average value is used as an average pooling result. The maximum pooling operator may be used for selecting a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 330:

After processing at the convolutional layer/pooling layer 320, the convolutional neural network 300 still cannot sufficiently output required output information. As described above, at the convolutional layer/pooling layer 320, only a feature is extracted, and parameters resulting from an input image are reduced. However, to generate final output information (required class information or other related information), the convolutional neural network 300 needs to use the neural network layer 330 to generate output of one required class or outputs of a group of required classes. Therefore, the neural network layer 330 may include a plurality of hidden layers (331, 332, . . . , and 33n shown in FIG. 3) and an output layer 340. Parameters included in the plurality of hidden layers may be obtained through pre-training based on related training data of a specific task type. For example, the task type may include image recognition, image classification, super-resolution image reconstruction, and the like.

The output layer 340 is located after the plurality of hidden layers in the neural network layer 330, namely, a last layer of the entire convolutional neural network 300. The output layer 340 has a loss function similar to a classification cross entropy, further for calculating a prediction error. Once forward propagation of the entire convolutional neural network 300 (as shown in FIG. 3, propagation from 310 to 340 is forward propagation) is completed, back propagation (as shown in FIG. 3, propagation from 340 to 310 is back propagation) starts to update weight values and offsets of the layers mentioned above to reduce a loss of the convolutional neural network 300 and an error between a result output by the convolutional neural network 300 through the output layer and an ideal result.

Figure 4:
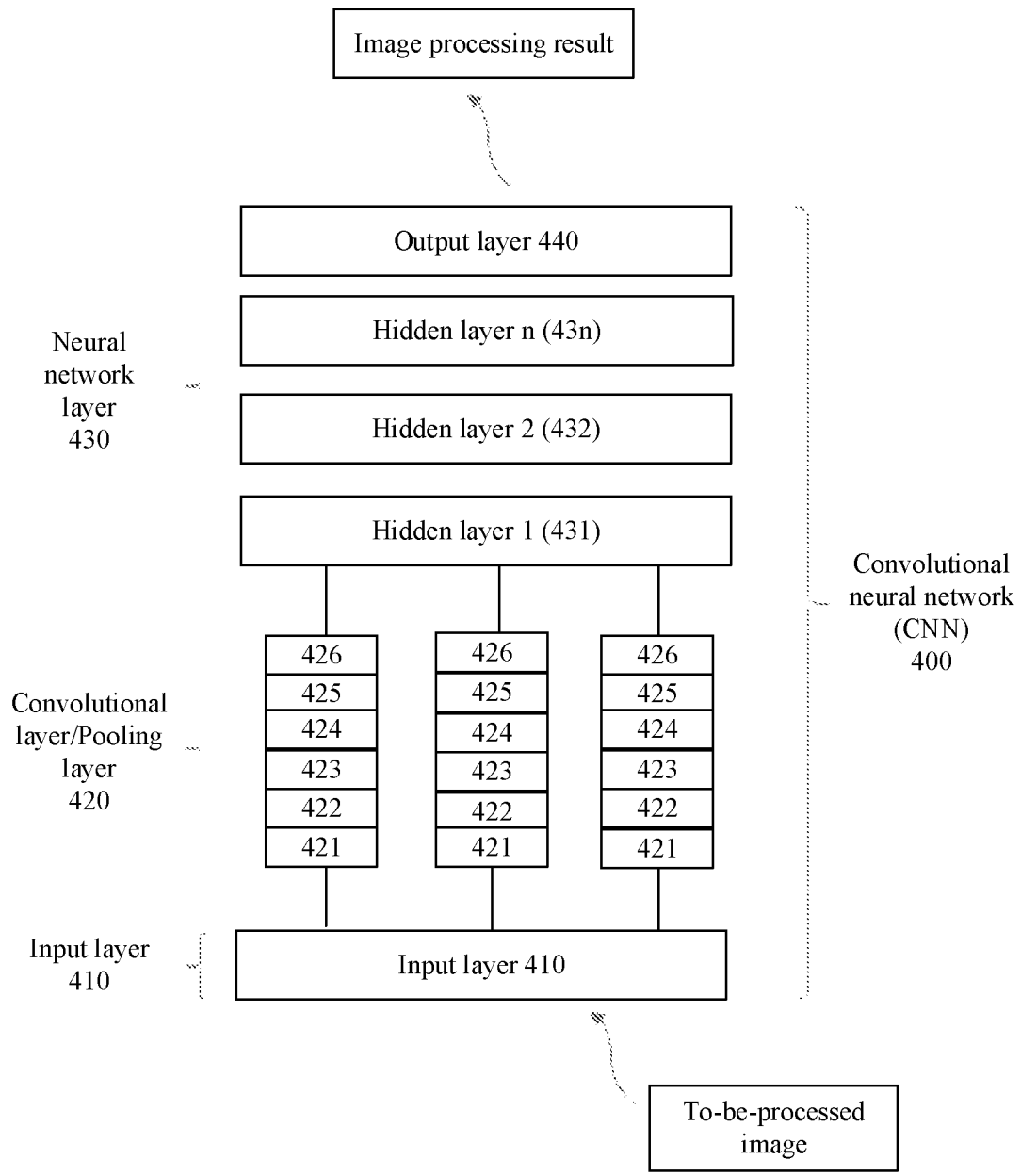
FIG. 4 is a schematic diagram of a structure of another convolutional neural network according to an embodiment of this disclosure.

A structure of the neural network in this embodiment of this disclosure may be shown in FIG. 4. In FIG. 4, a CNN 400 may include an input layer 410, a convolutional layer/pooling layer 420 (the pooling layer is optional), and a neural network layer 430. In comparison with FIG. 3, in FIG. 4, a plurality of convolutional layers/pooling layers (421 to 426) in convolutional layers/pooling layers 420 are parallel, and input separately extracted features into a full neural network layer 430 for processing. The neural network layer 430 may include a plurality of hidden layers such as a hidden layer 1 to a hidden layer n, and the hidden layer 1 to the hidden layer n may be denoted as 431 to 43n.

It should be noted that the convolutional neural networks shown in FIG. 3 and FIG. 4 are merely used as two possible convolutional neural network examples in this embodiment of this disclosure. In a specific application, the convolutional neural network in this embodiment of this disclosure may alternatively exist in a form of another network model.

In addition, a structure of a convolutional neural network obtained in a method for training a neural network structure in this embodiment of this disclosure may be shown as the structures of the convolutional neural networks in FIG. 3 and FIG. 4.

Figure 5:
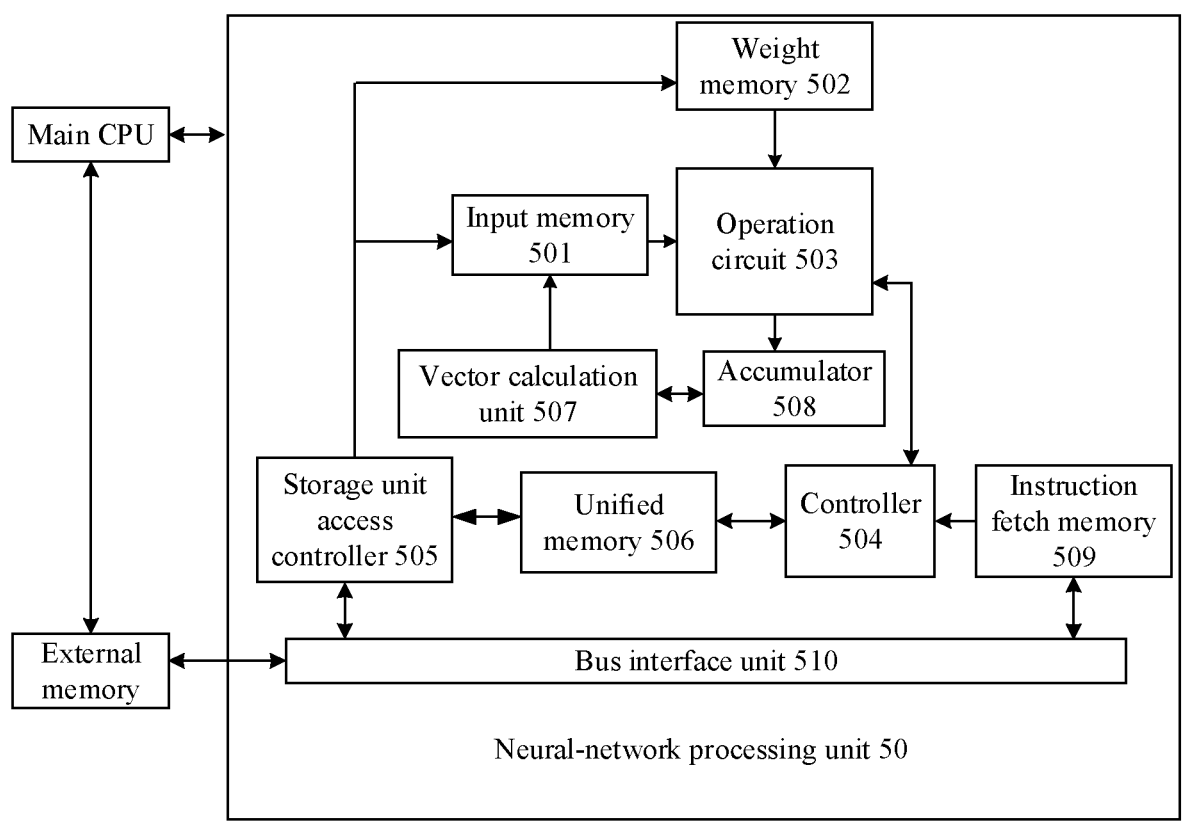
FIG. 5 is a schematic diagram of a hardware structure of a chip according to an embodiment of this disclosure.

FIG. 5 is a schematic diagram of a hardware architecture of a chip according to an embodiment of this disclosure. The chip includes a neural-network processing unit 50. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. Algorithms at all layers of the convolutional neural network shown in FIG. 3 or the convolutional neural network shown in FIG. 4 may be implemented in the chip shown in FIG. 5.

The neural-network processing unit NPU 50 serves as a coprocessor, and may be disposed on a host CPU. The host CPU assigns a task. A core part of the NPU is an operation circuit 503, and a controller 504 controls the operation circuit 503 to extract data from a memory (a weight memory or an input memory) and perform an operation.

In some implementations, the operation circuit 503 internally includes a plurality of processing elements (PEs). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from a weight memory 502, and buffers the corresponding data into each PE in the operation circuit. The operation circuit extracts data of the matrix A from an input memory 501, performs a matrix operation between the data of the matrix A and the matrix B to obtain a partial matrix result or a final matrix result, and stores the result into an accumulator 508.

A vector calculation unit 507 may perform further processing on the output of the operation circuit, for example, perform vector multiplication, vector addition, an exponential operation, a logarithmic operation, and value comparison. For example, the vector calculation unit 507 may be configured to perform network calculation, such as pooling, batch normalization, or local response normalization at a non-convolutional/non-fully connected (FC) layer in a neural network.

In some implementations, the vector calculation unit 507 can store a processed output vector in a unified memory 506. For example, the vector calculation unit 507 may apply a non-linear function to the output, for example, a vector of an accumulated value, of the operation circuit 503 to generate an activation value. In some implementations, the vector calculation unit 507 generates a normalized value, a combined value, or both. In some implementations, the processed output vector can be used as an activation input to the operation circuit 503, for example, used in a subsequent layer in the neural network.

The unified memory 506 is configured to store input data and output data.

A direct memory access controller (DMAC) 505 transfers input data in an external memory to the input memory 501 and/or the unified memory 506, stores, in the weight memory 502, weight data in the external memory, and stores, in the external memory, data in the unified memory 506.

A bus interface unit (BIU) 510 is configured to implement interaction between the host CPU, the DMAC, and an instruction fetch buffer 509 by using a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate (DDR) synchronous dynamic random-access memory (RAM) (SDRAM), a high bandwidth memory (HBM), or another readable and writable memory.

An operation of each layer in the convolutional neural networks shown in FIG. 3 and FIG. 4 may be performed by an operation circuit 503 or a vector calculation unit 507.

The execution device 110 in FIG. 2 described above can perform each step of a neural network training method or a data processing method in embodiments of this disclosure. CNN models shown in FIG. 3 and FIG. 4 and the chip shown in FIG. 5 may also be used to perform each step of the neural network training method or the data processing method in embodiments of this disclosure. The following describes in detail the neural network training method in embodiments of this disclosure and the data processing method in embodiments of this disclosure with reference to the accompanying drawings.

Figure 6:
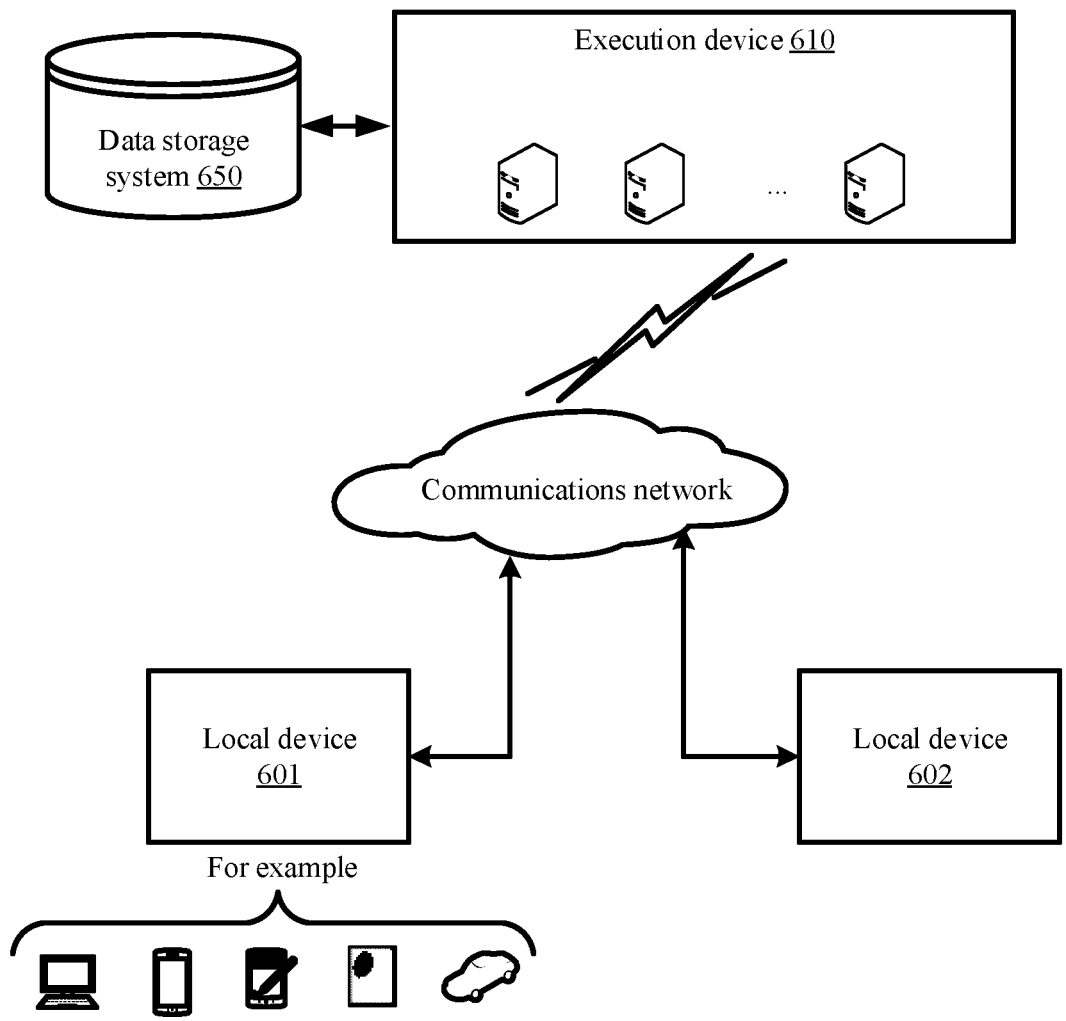
FIG. 6 is a schematic diagram of a system architecture according to an embodiment of this disclosure.

FIG. 6 shows a system architecture 600 according to an embodiment of this disclosure. The system architecture includes a local device 601, a local device 602, an execution device 610, and a data storage system 650. The local device 601 and the local device 602 are connected to the execution device 610 through a communications network.

The execution device 610 may be implemented by one or more servers. Optionally, the execution device 610 may cooperate with another computing device, for example, a device such as a data memory, a router, or a load balancer. The execution device 610 may be disposed on one physical site, or distributed on a plurality of physical sites. The execution device 610 may implement a neural network training method in an embodiment of this disclosure by using data in the data storage system 650 or by invoking program code in the data storage system 650.

Further, the execution device 610 may perform the following process inputting training data into a neural network, where the training data includes an image, text, or speech, determining a first input space of a second target layer in the neural network based on a first output space of a first target layer in the neural network, and inputting a feature vector in the first input space into the second target layer, to train the neural network, where a capability of fitting random noise by using an output space that is of a third target layer in the neural network and that exists when the feature vector in the first input space is input into the second target layer is lower than a capability of fitting the random noise by using an output space that is of the third target layer and that exists when a feature vector in the first output space is input into the second target layer.

The execution device 610 can build a target neural network by using the foregoing process. The target neural network may be used to process data such as an image, text, or speech, for example, may be used to perform image classification, image segmentation, text translation, or speech recognition.

A user may operate respective user device (for example, the local device 601 and the local device 602), to interact with the execution device 610. Each local device may be any computing device, such as a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 610 through a communication network of any communication mechanism/communication standard. The communication network may be a wide area network, a local area network, a point-to-point connection, or any combination thereof.

In an implementation, the local device 601 and the local device 602 obtain a related parameter of the target neural network from the execution device 610, deploy the target neural network on the local device 601 and the local device 602, and process data such as an image, text, or speech by using the target neural network, for example, perform image classification, image segmentation, text translation, speech recognition, or the like.

In another implementation, the target neural network may be directly deployed on the execution device 610. The execution device 610 obtains to-be-processed data from the local device 601 and the local device 602, and processes data such as an image, text, or speech based on the target neural network, for example, obtains a to-be-processed image, and performs classification or another type of image processing on the to-be-processed image based on the target neural network.

The execution device 210 may alternatively be a cloud device. In this case, the execution device 610 may be deployed at a cloud end. Alternatively, the execution device 610 may be a terminal device. In this case, the execution device 610 may be deployed on a user terminal side. This is not limited in this embodiment of this disclosure.

Figure 7:
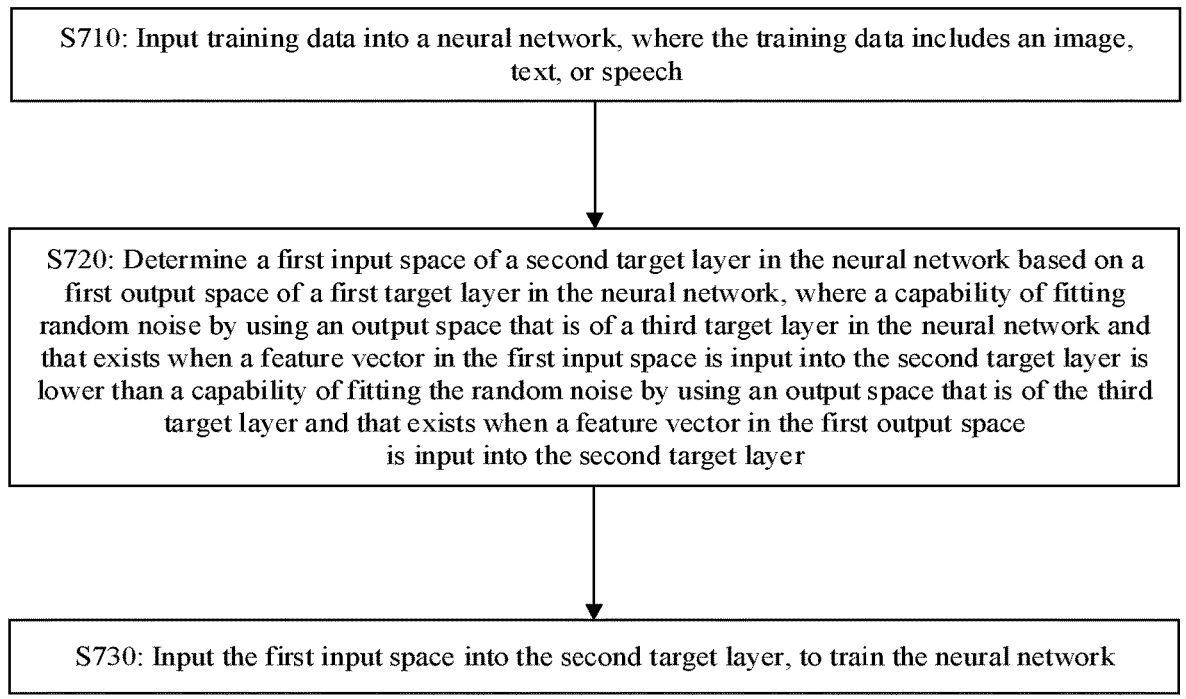
FIG. 7 is an example flowchart of a neural network training method according to this disclosure.

The following first describes in detail a neural network training method 700 in an embodiment of this disclosure with reference to FIG. 7. The method shown in FIG. 7 may be performed by a neural network training apparatus, and the neural network training apparatus may be an apparatus whose computing capability is sufficient to train a neural network, for example, a mobile terminal, a computer, or a server.

FIG. 7 is an example flowchart of a neural network training method according to this disclosure. As shown in FIG. 7, the method includes at least S710 to S730.

S710: Input training data into a neural network, where the training data includes an image, text, or speech.

S720: Determine a first input space of a second target layer in the neural network based on a first output space of a first target layer in the neural network, where a capability of fitting random noise by using an output space that is of a third target layer in the neural network and that exists when a feature vector in the first input space is input into the second target layer is lower than a capability of fitting the random noise by using an output space that is of the third target layer and that exists when a feature vector in the first output space is input into the second target layer.

Usually, the second target layer is a $1^{st}$ layer after the second target layer, and the third target layer is located after the first target layer.

That the third target layer is located after the first target layer may be understood as follows. The third target layer is the second target layer or a layer after the second target layer.

The first output space of the first target layer is in a one-to-one correspondence with the training data. In other words, the first output space of the first target layer is an output space obtained after the first target layer processes the training data. The first input space determined based on the first output space is also in a one-to-one correspondence with the first output space and the training data.

S730: Input the first input space into the second target layer, to train the neural network.

In the method, after the first target layer outputs the first output space, the feature vector in the first output space is not directly input into the second target layer. Instead, the first output space is processed, and a feature vector in a first input space obtained through processing is input into the second target layer, to continue to train the neural network. In addition, in comparison with the first output space existing before processing, after the first input space obtained through processing is input into the second target layer, a capability of fitting noise by using an output space of the second target layer or the output space of the third target layer after the second target layer may be lowered, in other words, a capability of fitting noise in the neural network may be lowered. Therefore, an overfitting phenomenon that occurs in the neural network can be avoided, and a generalization capability of the neural network can be improved, to finally help improve performance that exists when the neural network processes data such as an image, text, or speech, for example, accuracy of a prediction result.

The neural network in this embodiment of this disclosure may be a DNN, for example, may be a convolutional neural network or a recurrent neural network.

When the neural network is a convolutional neural network, an example of the neural network is a residual network. When the neural network is a convolutional neural network, usually, the input training data may be an image, and the first target layer may be a convolutional layer or a fully connected layer. It can be understood that, when the neural network is a convolutional neural network, the input training data may alternatively be another type of data such as text or speech, and the first target layer may alternatively be another type of network layer such as a pooling layer. This is not limited in this embodiment of this disclosure.

When the neural network is a recurrent neural network, usually, the input training data may be text or speech, and the first target layer may include a basic unit such as a long short-term memory (LSTM) unit, a bidirectional RNN (BRNN) unit, a memory network unit, or a gate recurrent unit. It can be understood that, when the neural network is a recurrent neural network, the input training data may alternatively be another type of data such as an image, and the first target layer may further include another basic unit that can constitute the recurrent neural network. A correspondence between a type of a neural network and input data is not limited in this disclosure.

In addition, it can be understood that if a basic unit in the recurrent neural network includes a single layer, different target layers correspond to the basic unit at different moments. For example, the first target layer corresponds to the basic unit at a first moment. In other words, the first output space is an output space of the basic unit at the first moment. The second target layer is the basic unit at a first execution moment (which may be referred to as a second moment) after the first moment. In other words, the first input space is an input space of the basic unit at the second moment. The third target layer is the basic unit at any execution moment after the first moment.

If the basic unit in the recurrent neural network includes a plurality of layers, different target layers may correspond to different layers in the basic unit at one moment. For example, the first target layer corresponds to one layer in the basic unit at a first moment. In other words, the first output space is an output space of one layer in the basic unit at the first moment. The second target layer is another layer in the basic unit at the first moment, and the other layer is located at a $1^{st}$ layer after the first target layer. In other words, the first input space is an input space of the other layer in the basic unit at the first moment. The third target layer is any layer after the first target layer in the basic unit at the first moment.

In this embodiment, when the second target layer and the third target layer are a same layer, a condition that needs to be met by the first input space determined based on the first output space of the first target layer may be understood as follows. A capability of fitting random noise by using an output space that is of the second target layer and that exists when the feature vector in the first input space is input into the second target layer is lower than a capability of fitting the random noise by using an output space that is of the second target layer and that exists when the feature vector in the first output space is input into the second target layer.

For example, when the neural network includes five layers, the first target layer may be a second layer of the neural network, the second target layer may be a third layer, and the second target layer and the third target layer are a same layer. In this case, a first input space that is of the third layer and that is determined based on a first output space of the second layer needs to meet the following condition: a capability of fitting noise by using the output space that is of the third layer and that exists when the feature vector in the first input space is input into the third layer is lower than a capability of fitting the noise by using the output space that is of the third layer and that exists when the feature vector in the first output space is directly input into the third layer.

An example in which the second target layer and the third target layer are not a same layer is as follows. The neural network includes five layers, the first target layer may be a second layer of the neural network, the second target layer may be a third layer, and the third target layer may be a fifth layer. In this case, a first input space that is of the third layer and that is determined based on a first output space of the second layer needs to meet the following condition: a capability of fitting noise by using an output space that is of the fifth layer and that exists when the feature vector in the first input space is input into the third layer is lower than a capability of fitting the noise by using an output space that is of the fifth layer and that exists when the feature vector in the first output space is directly input into the third layer.

In some possible implementations, the capability of fitting the noise by using the output space of the third target layer may be measured based on Rademacher (rademacher) complexity of the third target layer. To be specific, the first input space determined based on the first output space needs to meet the following condition. First Rademacher complexity of the third target layer is less than second Rademacher complexity of the third target layer, the first Rademacher complexity is determined based on the output space that is of the third target layer and that exists when the feature vector in the first input space is input into the second target layer, and the second Rademacher complexity is determined based on the output space that is of the third target layer and that exists when the feature vector in the first output space is input into the second target layer.

For example, the input space of the second target layer is the first input space. Rademacher complexity of the third target layer may be calculated based on Formula (1):

$$R_D(f(x_i)) = \frac{1}{N}\left[\sup_k \left|\left\langle K'[k,:], \sum_{i=1}^{N}\sigma_i \cdot f(x_i)\right\rangle\right|\right] \quad (1)$$

In Formula (1), $R_D(f(x_i))$ represents the Rademacher complexity of the third target layer, $\sigma_i$ is $-1$ or $1$ and represents a value of the random noise, $K'[k,:]$ represents a $k^{th}$ row in a weight matrix of the third target layer, "$\langle,\rangle$" represents point-wise multiplication, $f(x_i)$ represents an $i^{th}$ output space in the output space of the third target layer when an $i^{th}$ input space in the first input space is input into the second target layer, the $i^{th}$ output space is an output space corresponding to $i^{th}$ data in the training data, i is a positive integer less than or equal to N, N is an amount of the training data, and $$\sup_k \left|\left\langle K'[k,:]^T, \sum_{i=1}^{N}\sigma_i \cdot f(x_i)\right\rangle\right|$$

represents that k in $$\sup_k \left|\left\langle K'[k,:]^T, \sum_{i=1}^{N}\sigma_i \cdot f(x_i)\right\rangle\right|$$

is used to maximize a value of $$\left|\left\langle K'[k,:], \sum_{i=1}^{N}\sigma_i \cdot f(x_i)\right\rangle\right|.$$

In this implementation, in comparison with the first output space, after the first input space determined based on the first output space is input into the second target layer, Rademacher complexity of an output space of the second target layer or another layer after the second target layer can be reduced. Because the capability of fitting the noise by using the output space of the third target layer is also reduced correspondingly after Rademacher complexity of the output space of the third target layer is reduced, an overfitting phenomenon that occurs in the neural network can be avoided, and a generalization capability of the neural network can be improved, to finally help improve performance that exists when the neural network processes data such as a new image, text, or speech.

For ease of understanding, unless otherwise specified, an example in which the third target layer and the second target layer are a same layer is used for description in the following content.

Figure 8:
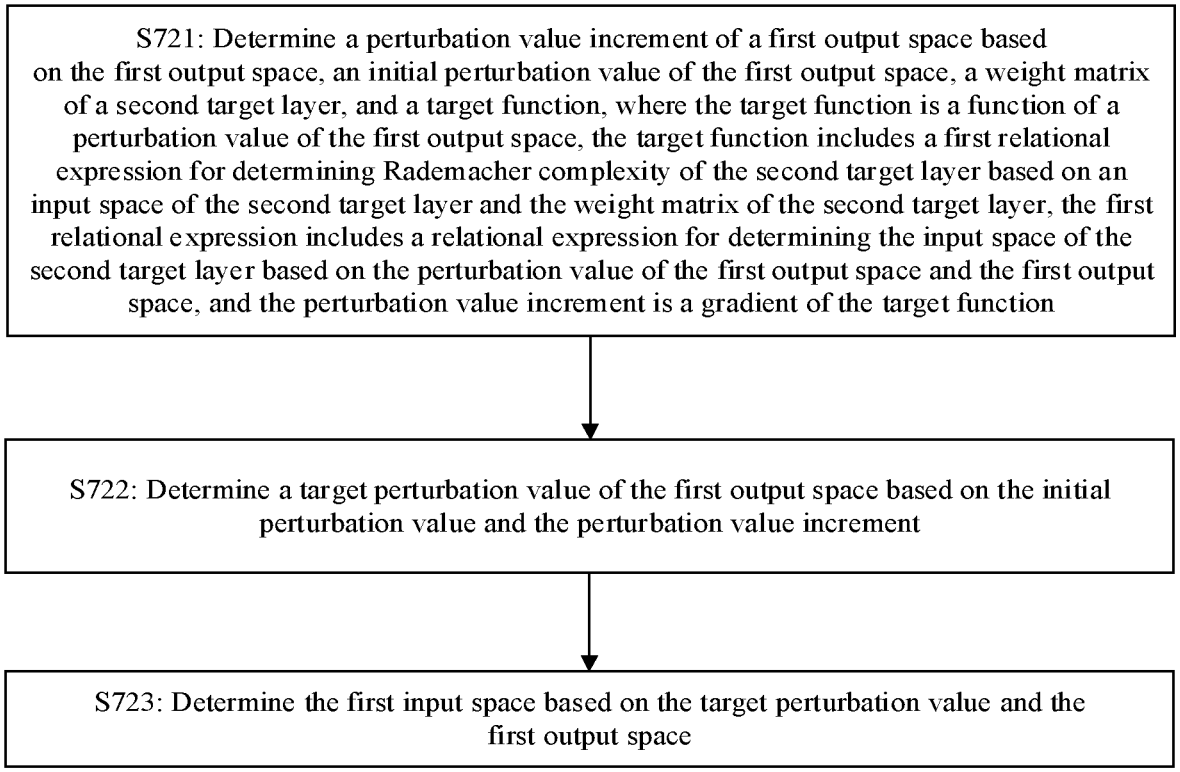
FIG. 8 is another example flowchart of a neural network training method according to this disclosure.

In some possible implementations, S720 (to be specific, the determining a first input space of a second target layer in the neural network based on a first output space of a first target layer in the neural network) may include three steps S721 to S723 shown in FIG. 8.

S721: Determine a perturbation value increment of the first first output space based on the first output space, an initial perturbation value of the first output space, a weight matrix of the second target layer, and a target function, where the target function is a function of a perturbation value of the first output space, the target function includes a first relational expression for determining Rademacher complexity of the second target layer based on the input space of the second target layer and the weight matrix of the second target layer, the first relational expression includes a relational expression for determining the input space of the second target layer based on the perturbation value of the first output space and the first output space, and the perturbation value increment is a gradient of the target function.

Each time the neural network is trained based on the training data, and it is the first time performing S721 for the first target layer, a used initial perturbation value may be preset, or may be obtained through random initialization, or the initial perturbation value may be 0. That the initial perturbation value is 0 may be equivalent to that the initial perturbation value is not used.

Each time the neural network is trained based on the training data, and it is not the first time performing S721 for the first target layer, a used initial perturbation value may be a target perturbation value obtained by performing S722 before S721 is currently performed and after S721 is previously performed.

S722: Determine a target perturbation value of the first output space based on the initial perturbation value and the perturbation value increment.

For example, the perturbation value increment may be subtracted from the initial perturbation value, and an obtained perturbation value is the target perturbation value.

S723: Determine the first input space based on the target perturbation value and the first output space.

In this implementation, because the target function includes the first relational expression for calculating the Rademacher complexity of the second target layer, the gradient of the target function is obtained, the gradient is determined as the perturbation value increment, the target perturbation value is determined based on the perturbation value increment, and perturbation processing is performed on the first output space based on the target perturbation value, to obtain the first input space, so that after the first input space is input into the second target layer, Rademacher complexity of the output space corresponding to the second target layer greatly decreases. Therefore, the capability of fitting noise by using the output space of the second target layer can be greatly reduced, and training efficiency can be improved.

An example of the target function is shown in Formula (2):

$$\frac{1}{N}\left[\sup_k \left|\left\langle K'[k,:], \sum_{i=1}^{N}\sigma_i[f(x_i) - m_i \circ \varepsilon_i]\right\rangle\right|\right] \quad (2)$$

In Formula (2), $\sigma_i$ is $-1$ or $1$ and represents a value of the random noise, $K'[k,:]$ represents a $k^{th}$ row in the weight matrix of the second target layer, "$\langle,\rangle$" represents point-wise multiplication, $$\sup_k \left|\left\langle K'[k,:]^T, \sum_{i=1}^{N}\sigma_i[f(x_i) - m_i \circ \varepsilon_i]\right\rangle\right|$$

represents that k in $$\sup_k \left| \left\langle K'[k,:]^T, \sum_{i=1}^N \sigma_i[f(x_i) - m_i \circ \varepsilon_i] \right\rangle \right|$$

is used to maximize a value of $$\left| \left\langle K'[k,:]^T, \sum_{i=1}^N \sigma_i[f(x_i) - m_i \circ \varepsilon_i] \right\rangle \right|,$$

$f(x_i)$ represents an $i^{th}$ output space in the first output space, the $i^{th}$ output space is an output space corresponding to $i^{th}$ data in the training data, i is a positive integer less than or equal to N, N is an amount of the training data, "$\circ$" represents element-wise multiplication, namely, multiplication of elements at a same location, a length of $m_i$ is the same as a length of $f(x_i)$, a value of each element in $m_i$ is 0 or 1, where that the value is 1 indicates to perturb an output value of a corresponding location in the $i^{th}$ output space, and that the value is 0 indicates not to perturb the output value of the corresponding location in the $i^{th}$ output space, $\varepsilon_i$ represents the initial perturbation value, and $f(x_i)-m_i\circ\varepsilon_i$ represents an $i^{th}$ input space that is of the second target layer and that is determined based on the first output space and the initial perturbation value.

The value of each element in $m_i$ can be randomly initialized to 0 or 1. Alternatively, each element in $m_i$ may be first randomly initialized to 0 or 1, and then some or all elements around the element initialized to 1 are also set to 1, so that an overfitting phenomenon that occurs in the neural network can be further avoided. Herein, the some or all elements around the element are elements neighboring to the element.

In some possible implementations, the target function may further include a regular term of the perturbation value of the first output space. In other words, in addition to the first relational expression for calculating the Rademacher complexity of the second target layer, the target function further includes the regular term of the perturbation value of the first output space. In this way, a magnitude of a perturbation value increment obtained through calculation each time may be constrained, to constrain a value of a target perturbation value obtained through calculation each time, so that the Rademacher complexity of the output space corresponding to the second target layer can be prevented from being too small, and a loss on an expression capability of the neural network can be prevented from being too large, to finally help guarantee performance of the neural network.

Optionally, in some possible implementations, the target function includes another regular term of the perturbation value of the first output space. For example, the regular term may be a relational expression of an average value of the perturbation value of the first output space.

For example, when the neural network includes a classification network, in the foregoing several implementations, a classification precision difference between a test set and a training set can be narrowed without obviously reducing classification precision, to improve performance of the neural network.

When the target function further includes the regular term of the perturbation value of the first output space, an example of the target function is shown in Formula (3):

$$\frac{1}{N}\left[\sup_k \left|\left\langle K'[k,:], \sum_{i=1}^N \sigma_i[f(x_i) - m_i \circ \varepsilon_i] \right\rangle\right| + \frac{\lambda}{2}\sum_{i=1}^N \|\varepsilon_i\|_2^2 \right] \quad (3)$$

In Formula (3), $\sigma_i$ is −1 or 1 and represents a value of the random noise, K'[k,:] represents a $k^{th}$ row in the weight matrix of the second target layer, "$\langle , \rangle$" represents pointwise multiplication, $$\sup_k \left| \left\langle K'[k,:]^T, \sum_{i=1}^N \sigma_i[f(x_i) - m_i \circ \varepsilon_i] \right\rangle \right|$$

represents that k in $$\sup_k \left| \left\langle K'[k,:]^T, \sum_{i=1}^N \sigma_i[f(x_i) - m_i \circ \varepsilon_i] \right\rangle \right|$$

is used to maximize a value of $$\left| \left\langle K'[k,:]^T, \sum_{i=1}^N \sigma_i[f(x_i) - m_i \circ \varepsilon_i] \right\rangle \right|,$$

$f(x_i)$ represents an $i^{th}$ output space in the first output space, the $i^{th}$ output space is an output space corresponding to $i^{th}$ data in the training data, i is a positive integer less than or equal to N, N is an amount of the training data, "$\circ$" represents element-wise multiplication, namely, multiplication of elements at a same location, a length of $m_i$ is the same as a length of $f(x_i)$, a value of each element in $m_i$ is 0 or 1, where that the value is 1 indicates to perturb an output value of a corresponding location in the $i^{th}$ output space, and that the value is 0 indicates not to perturb the output value of the corresponding location in the $i^{th}$ output space, $\varepsilon_i$ represents the initial perturbation value, $f(x_i)-m_i\circ\varepsilon_i$ represents an $i^{th}$ input space that is of the second target layer and that is determined based on the first output space and the initial perturbation value, "$\|\ \|_2$" represents a quadratic norm, and $\lambda$ is a preconfigured parameter value.

In some implementations, when the perturbation value increment of the first output space is determined based on the first output space, the initial perturbation value of the first output space, the weight matrix of the second target layer, and the target function, a gradient of the target function with respect to a perturbation value may be calculated based on the first output space, the initial perturbation value of the first output space, and the weight matrix of the second target layer, and the gradient may be used as the perturbation value increment of the first output space.

In an implementation of S723 (determining the first input space based on the target perturbation value and the first output space), the first input space may be obtained through calculation based on Formula (3):

$$\hat{f}(x_i)=f(x_i)-m_i\circ\varepsilon_i, \quad (3)$$

In Formula (3), $f(x_i)$ represents the $i^{th}$ output space in the first output space, the $i^{th}$ output space is the output space corresponding to the $i^{th}$ data in the training data, i is a positive integer less than or equal to N, N is the amount of the training data, "$\circ$" represents element-wise multiplication, $\hat{f}(x_i)$ represents an $i^{th}$ input space obtained by performing perturbation adjustment on the $i^{th}$ output space, N input spaces form the first input space, a size of $m_i$ is the same as a size of $f(x_i)$, the value of each element in $m_i$ is 0 or 1, where that the value is 1 indicates to perturb an output value of a corresponding location in the $i^{th}$ output space, and that the value is 0 indicates not to perturb the output value of the corresponding location in the $i^{th}$ output space, and $\varepsilon_i$ represents the perturbation value of the target first output space.

In another implementation of S723 (determining the first input space based on the target perturbation value and the first output space), the target perturbation value, the first output space, and the weight matrix of the second target layer may be substituted into the target function, to calculate a target function value of the target function, and then whether S721 to S723 need to be repeatedly performed is determined based on the target function value and the initial function value of the target function, to repeatedly update the perturbation value increment, so that an optimal perturbation value increment is obtained, to determine an optimal target perturbation value, and further obtain an optimal first input space. In this way, after the first input space is input into the second target layer, an overfitting phenomenon existing in the neural network can be better avoided based on the capability of fitting the noise by using the output space of the second target layer.

Each time the neural network is trained based on the training data, and it is the first time performing S723 for the first target layer, a used initial function value may be preset, or may be obtained through random initialization, or the initial function value may be 0. That the initial function value is 0 may be equivalent to that the initial function value is not used.

Each time the neural network is trained based on the training data, and it is not the first time performing S723 for the first target layer, a used initial function value may be a target function value obtained by previously performing S723.

In an implementation of determining, based on the target function value and the initial function value of the target function, whether S721 to S723 need to be repeatedly performed, an absolute value of a difference between the target function value and the initial function value may be calculated, and if the absolute value is less than or equal to a preset threshold, it indicates that a current target perturbation value has enabled the target function to converge, and repeatedly performing S721 to S723 may be stopped, or it indicates that the target function does not converge, the initial function value needs to be updated to a current target function value, the initial perturbation value needs to be updated to a current target perturbation value, and S721 to S723 are repeatedly performed.

When it is determined that the target function converges, after repeatedly performing S721 to S723 may be stopped, perturbation adjustment may be performed on the first output space based on the target perturbation value, and an output space obtained through adjustment is determined as the first input space. For example, the current target perturbation value, the first input space, and the weight matrix of the second target layer may be substituted into the formula (3), to calculate the first input space.

Figure 9:
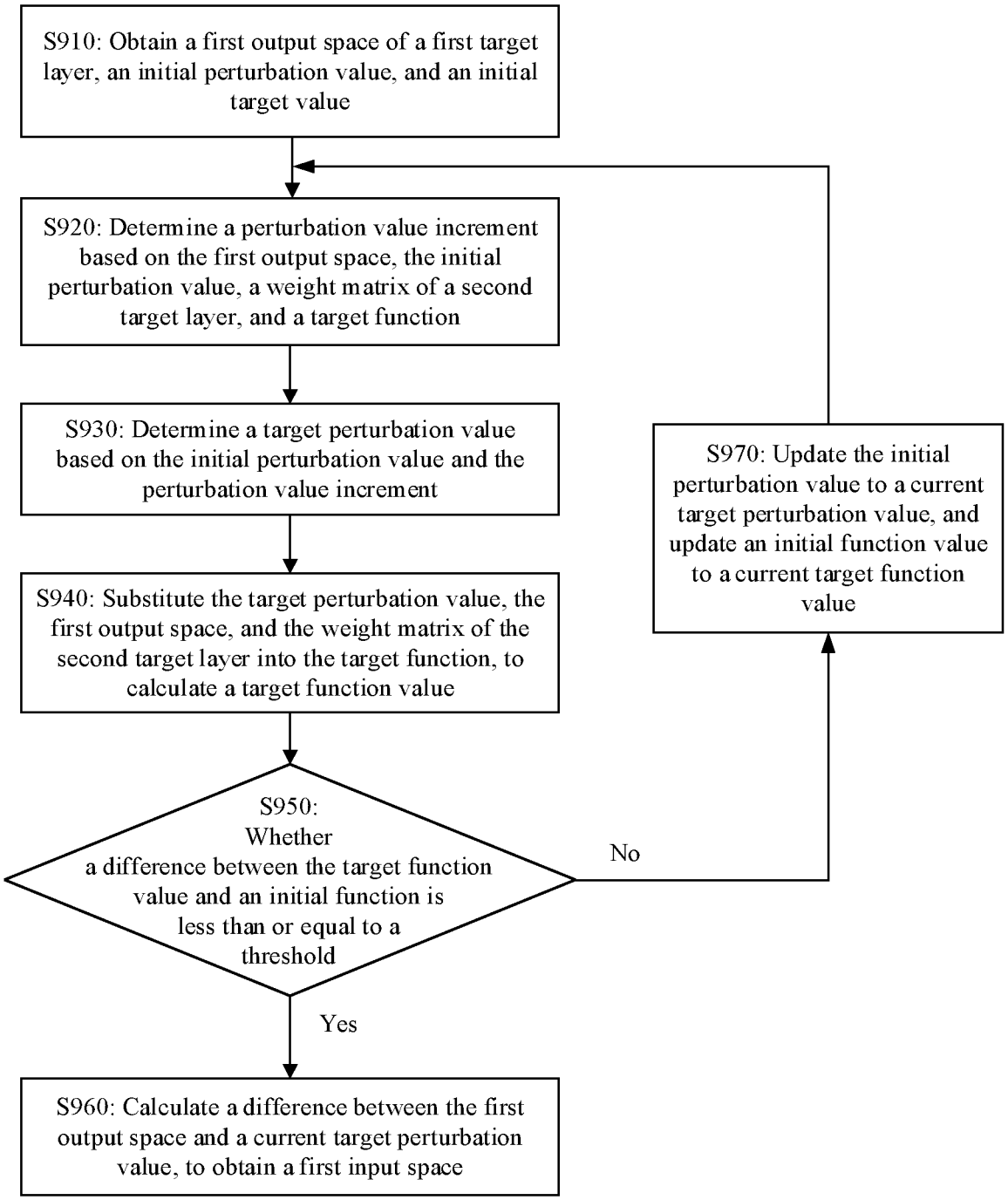
FIG. 9 is another example flowchart of a neural network training method according to this disclosure.
Figure 14:
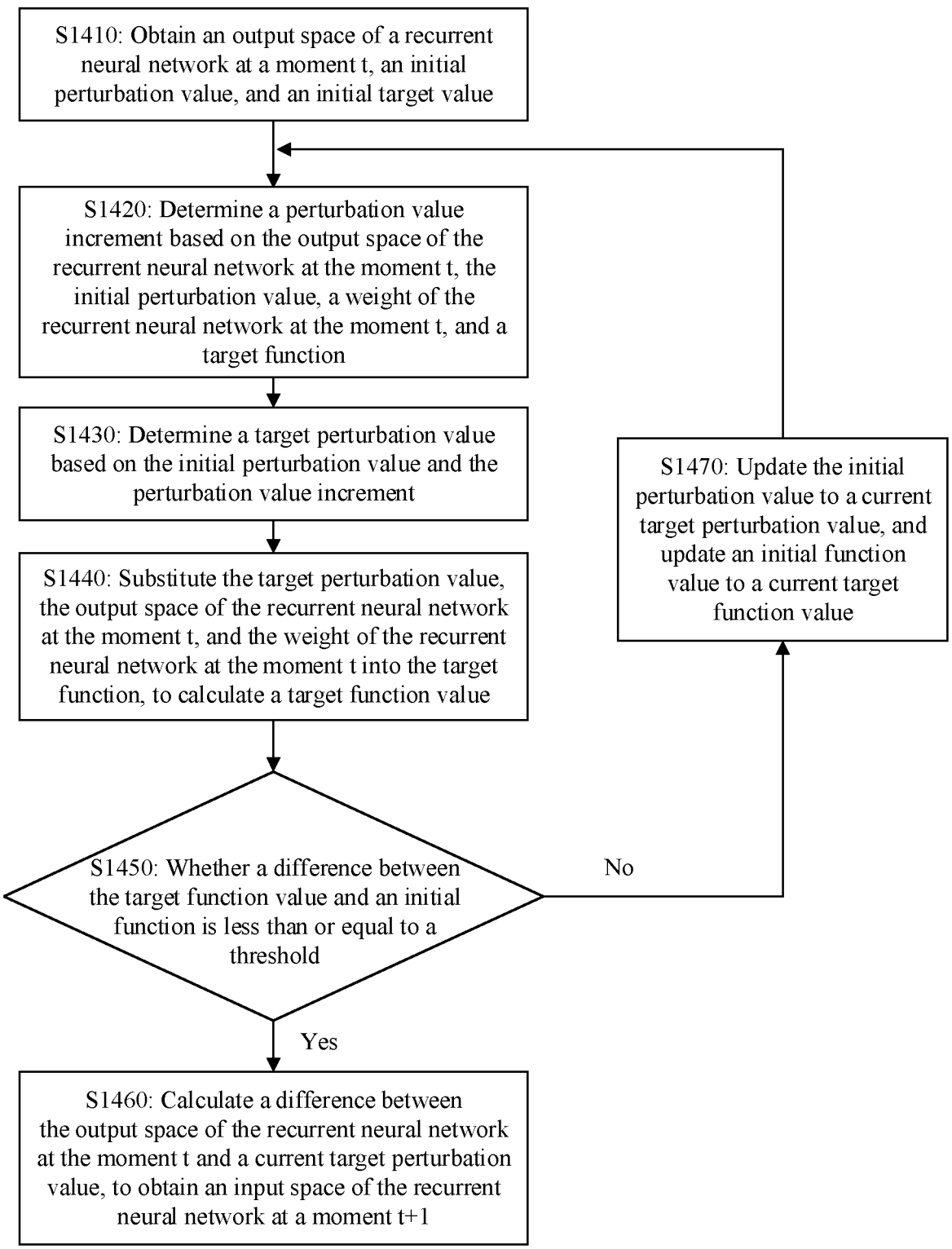
FIG. 14 is another example flowchart of a neural network training method according to this disclosure.

In this embodiment, the inputting the first input space into the second target layer, to train the neural network in S730 may include, after the second target layer generates an output space based on the first input space, using the second target layer as the first target layer, using the output space as the first output space, using a layer after the second target layer as a new second target layer, and continuing to perform an operation in FIG. 8 or even an operation in FIG. 9 or FIG. 14.

After a last layer of the neural network outputs a result, a weight of each layer of the neural network is updated based on a loss function of the neural network, to complete one time of training.

In other words, in the method in this embodiment, a capability of fitting noise by a plurality of layers or even all layers of the neural network may be lowered, to further improve performance of the neural network.

The following describes, with reference to FIG. 9, an implementation of obtaining a better first input space when the trained neural network is a convolutional neural network. The method shown in FIG. 9 may include S910 to S970.

S910: Obtain a first output space of a first target layer, an initial perturbation value, and an initial target value.

S920: Determine a perturbation value increment based on the first output space, the initial perturbation value, a weight matrix of a second target layer, and a target function. For this step, refer to S721.

S930: Determine a target perturbation value based on the initial perturbation value and the perturbation value increment. For this step, refer to S722.

S940: Substitute the target perturbation value, the first output space, and the weight matrix of the second target layer into the target function, to calculate a target function value.

S950: Determine whether a difference between the target function value and an initial function is less than or equal to a threshold, and perform S960 if the difference between the target function value and the initial function is less than or equal to the threshold, or perform S970 if the difference between the target function value and the initial function is not less than or equal to the threshold.

S960: Calculate a difference between the first output space and a current target perturbation value, to obtain a first input space.

S970: Update the initial perturbation value to a current target perturbation value, and update an initial function value to a current target function value.

After the first input space is obtained in S960, the first input space may be input into the second target layer, and the convolutional neural network continues to be trained, in other words, S730 continues to be performed. In a process of performing S730, the first target layer may be further selected, and an operation in FIG. 9 is repeatedly performed.

The following describes an implementation of obtaining a better first input space when the trained neural network is a recurrent neural network. If a basic unit in the recurrent neural network includes a plurality of layers, and one target layer corresponds to one layer in the basic unit at a same execution moment, for an implementation of obtaining the better first input space, refer to the implementation shown in FIG. 9.

The following describes, with reference to FIG. 14, an implementation of obtaining a better first input space when a basic unit in a recurrent neural network includes a single layer, and one target layer corresponds to the basic unit at one moment. The method shown in FIG. 14 may include S1410 to S1470.

S1410: Obtain an output space of the recurrent neural network at a moment t, an initial perturbation value, and an initial target value. The basic unit in the recurrent neural network at the moment t is the first target layer, and an output space of the basic unit in the recurrent neural network at the moment t is the first output space.

S1420: Determine a perturbation value increment based on the output space of the recurrent neural network at the moment t, the initial perturbation value, a weight of the recurrent neural network at the moment t, and a target function.

The basic unit in the recurrent neural network at a moment t+1 is a second target layer, a weight of the basic unit in the recurrent neural network at the moment t is a weight of the second target layer, and an input space of the recurrent neural network at the moment t+1 is the first input space. For this step, refer to S721.

S1430: Determine a target perturbation value based on the initial perturbation value and the perturbation value increment. For this step, refer to S722.

S1440: Substitute the target perturbation value, the output space of the recurrent neural network at the moment t, and the weight of the recurrent neural network at the moment t into the target function, to calculate the target function value.

S1450: Determine whether a difference between the target function value and an initial function is less than or equal to a threshold, and perform S1460 if the difference between the target function value and the initial function is less than or equal to the threshold, or perform S1470 if the difference between the target function value and the initial function is not less than or equal to the threshold.

S1460: Calculate a difference between the output space of the recurrent neural network at the moment t and a current target perturbation value, to obtain the input space of the recurrent neural network at the moment t+1.

S1470: Update the initial perturbation value to the current target perturbation value, and update an initial function value to a current target function value.

After the input space of the recurrent neural network at the moment t+1 is obtained in S1460, the input space may be input into the recurrent neural network, and the recurrent neural network continues to be trained, in other words, S730 continues to be performed. In a process of performing S730, a moment may be further determined as the moment t, and then an operation in FIG. 14 is performed.

In this embodiment, optionally, a capability of fitting noise by using an output space of a third target layer may be measured based on information such as a Vapnik-Chervonenkis (VC) dimension, a maximum discrepancy, or a Gaussian complexity of the third target layer. For a manner in which a first input space of the second target layer is determined based on a first output space of the first target layer when the capability of fitting the noise by using the output space of the third target layer is measured based on any one of the foregoing information, refer to the foregoing manner in which the first input space of the second target layer is determined based on the first output space of the first target layer when the capability of fitting the noise by using the output space of the third target layer is measured based on Rademacher complexity of the third target layer. Details are not described herein again.

After a neural network is obtained through training in the foregoing method, the neural network may be deployed in an actual application scenario, for example, deployed in an application scenario of language translation, sentence repeating, intelligent driving, image classification, image segmentation, or object detection, to perform language translation, sentence repeating, intelligent driving, image classification, image segmentation, or object detection based on the neural network, so as to implement a corresponding objective and requirement.

Figure 10:
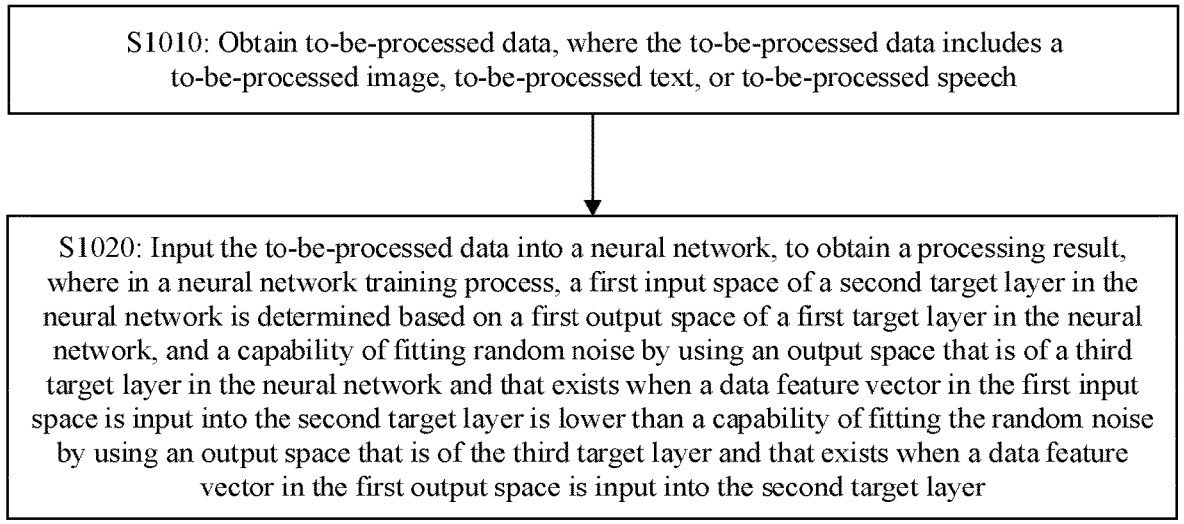
FIG. 10 is an example flowchart of a method for processing data by using a neural network according to this disclosure.

FIG. 10 is an example flowchart of a method for processing data by using a neural network according to this disclosure. The method may include S1010 and S1020.

S1010: Obtain to-be-processed data, where the to-be-processed data includes a to-be-processed image, to-be-processed text, or to-be-processed speech.

It can be understood that the to-be-processed data may alternatively be other similar data, for example, a vehicle track, temperature, humidity, or weather. A type of the to-be-processed data is not limited in this embodiment of this disclosure.

S1020: Input the to-be-processed data into the neural network, to obtain a processing result, where in a neural network training process, a first input space of a second target layer in the neural network is determined based on a first output space of a first target layer in the neural network, and a capability of fitting random noise by using an output space that is of a third target layer in the neural network and that exists when a feature vector in the first input space is input into the second target layer is lower than a capability of fitting the random noise by using an output space that is of the third target layer and that exists when a feature vector in the first output space is input into the second target layer.

The neural network may be a neural network obtained through training in the foregoing training method. For example, the neural network may be a convolutional neural network or a recurrent neural network. The neural network can be used to implement functions such as object detection, image classification, image segmentation, speech recognition, and text translation.

A type of a to-be-processed image to be input into the neural network is the same as a type of data used when the neural network is trained. For example, when the neural network is a convolutional neural network, to-be-processed data to be input into the neural network may be an image. When the neural network is a recurrent neural network, the to-be-processed data to be input into the neural network may be text or speech.

In the neural network training process in the method, the first input space of the second target layer in the neural network is determined based on the first output space of the first target layer in the neural network, and the capability of fitting the random noise by using the output space of the third target layer and that exists when the first input space is input into the second target layer is lower than the capability of fitting the random noise by using the output space of the third target layer and that exists when the first output space is input into the second target layer. In other words, the capability of fitting the noise by using the neural network is low. Therefore, a generalization capability of the neural network is high. To be specific, when the neural network processes data such as an image, text, or speech, there is high performance, for example, high precision of a prediction result.

The neural network in this embodiment may be obtained through training based on any one of the foregoing neural network training methods. Therefore, the neural network also has a feature of the neural network obtained through training in the foregoing training methods, and a corresponding effect can also be achieved when data is processed.

Figure 11:
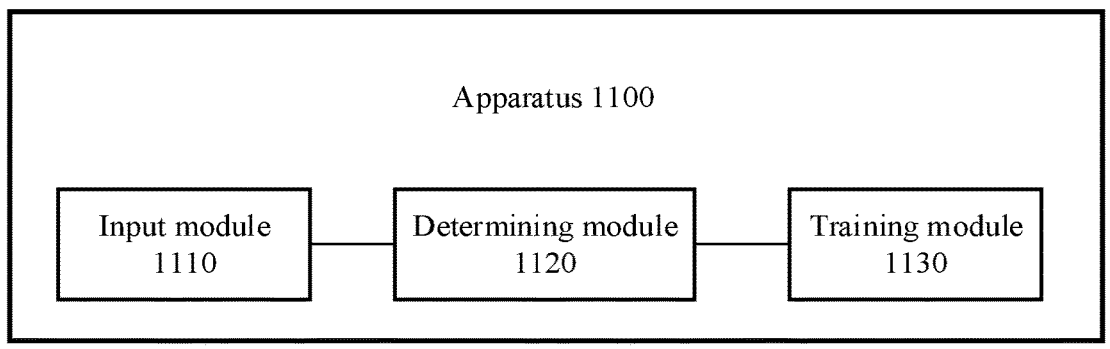
FIG. 11 is a diagram of an example structure of a neural network training apparatus according to this disclosure.

FIG. 11 is a diagram of an example structure of a neural network training apparatus according to this disclosure. An apparatus 1100 includes an input module 1110, a determining module 1120, and a training module 1130. The apparatus 1100 may implement the method shown in any one of FIG. 7 to FIG. 9.

For example, the input module 1110 is configured to perform S710, the determining module 1120 is configured to perform S720, and the training module 1130 is configured to perform S730.

Optionally, the determining module 1120 may be configured to perform S721 to S723.

Optionally, the determining module 1120 may be configured to perform S910 to S970.

In some possible implementations, the apparatus 1100 may be the training device 220 in FIG. 2. In some other possible implementations, the apparatus 1100 may be the neural network processor 50 shown in FIG. 5. In some other possible implementations, the apparatus 1100 may be the execution device 610 described in FIG. 6.

The apparatus 1100 may be deployed in a cloud environment, and the cloud environment is an entity that provides a cloud service for a user by using a basic resource in a cloud computing mode. The cloud environment includes a cloud data center and a cloud service platform. The cloud data center includes a large quantity of basic resources (including computing resources, storage resources, and network resources) owned by a cloud service provider. The computing resources included in the cloud data center may be a large quantity of computing devices (for example, servers). The apparatus 1100 may be a server that is in a cloud data center and that is configured to train a neural network. The apparatus 1100 may alternatively be a virtual machine that is created in a cloud data center and that is configured to train a neural network. The apparatus 1100 may alternatively be a software apparatus deployed on the server or the virtual machine in the cloud data center. The software apparatus is configured to train the neural network. The software apparatus may be deployed on a plurality of servers in a distributed manner, or deployed on a plurality of virtual machines in a distributed manner, or deployed on the virtual machine and the server in a distributed manner. For example, the input module 1110, the determining module 1120, and the training module 1130 in the apparatus 1100 may be deployed on a plurality of servers in a distributed manner, or deployed on a plurality of virtual machines in a distributed manner, or deployed on a virtual machine and a server in a distributed manner. For another example, when the determining module 1120 includes a plurality of submodules, the plurality of submodules may be deployed on a plurality of servers, deployed on a plurality of virtual machines in a distributed manner, or deployed on the virtual machine and the server in a distributed manner.

The apparatus 1100 may be provided by a cloud service provider to the user by being abstracted into a cloud service of the neural network on a cloud service platform. After the user purchases the cloud service on the cloud service platform, a cloud environment provides, by using the cloud service, the user with a cloud service for training the neural network. The user may upload a to-be-trained neural network (and may further upload an original training set) to the cloud environment through an application programming interface (API) or a web page interface provided by the cloud service platform. The apparatus 1100 receives the to-be-trained neural network and the training set, and trains the neural network by using the training set. A neural network finally obtained through training is returned by the apparatus 1100 to an edge device of the user.

When the apparatus 1100 is a software apparatus, the apparatus 1100 may alternatively be independently deployed on a computing device in any environment.

Figure 12:
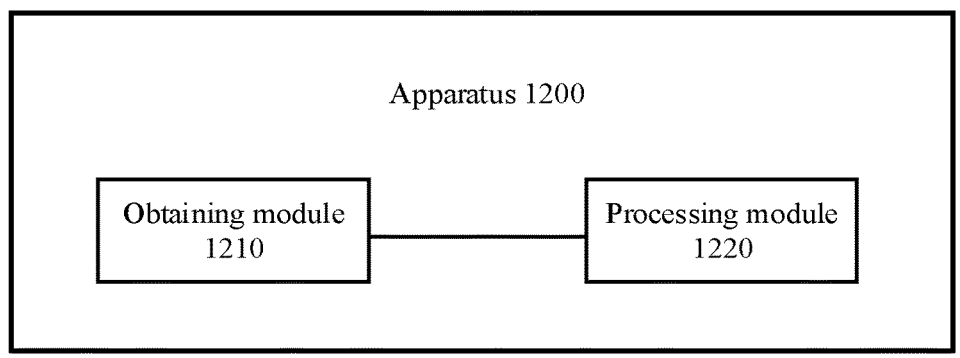
FIG. 12 is a diagram of an example structure of an apparatus for processing data by using a neural network according to this disclosure.

FIG. 12 is a diagram of an example structure of an apparatus for processing data by using a neural network according to this disclosure. The apparatus 1200 includes an obtaining module 1210 and a processing module 1220. The apparatus 1200 may implement the method shown in FIG. 10. For example, the obtaining module 1210 is configured to perform S1010, and the processing module 1220 is configured to perform S1020.

In some possible implementations, the apparatus 1200 may be the execution device 210 in FIG. 2. In some other possible implementations, the apparatus 1200 may be the neural network processor 50 shown in FIG. 5. In some other possible implementations, the apparatus 1200 may be the local device 601 or the local device 602 in FIG. 6.

The apparatus 1200 may be deployed in a cloud environment, and the cloud environment is an entity that provides a cloud service for a user by using a basic resource in a cloud computing mode. The cloud environment includes a cloud data center and a cloud service platform. The cloud data center includes a large quantity of basic resources (including computing resources, storage resources, and network resources) owned by a cloud service provider. The computing resources included in the cloud data center may be a large quantity of computing devices (for example, servers). The apparatus 1200 may be a server that is in a cloud data center and that is configured to process data by using the neural network. The apparatus 1200 may alternatively be a virtual machine that is created in a cloud data center and that is configured to process data by using the neural network. The apparatus 1200 may alternatively be a software apparatus deployed on the server or the virtual machine in the cloud data center. The software apparatus is configured to process data by using the neural network. The software apparatus may be deployed on a plurality of servers in a distributed manner, or deployed on a plurality of virtual machines in a distributed manner, or deployed on the virtual machine and the server in a distributed manner. For example, the obtaining module 1210 and the processing module 1220 in the apparatus 1200 may be deployed on a plurality of servers in a distributed manner, or deployed on a plurality of virtual machines in a distributed manner, or deployed on a virtual machine and a server in a distributed manner. For another example, when the processing module 1220 includes a plurality of submodules, the plurality of submodules may be deployed on a plurality of servers, deployed on a plurality of virtual machines in a distributed manner, or deployed on the virtual machine and the server in a distributed manner.

The apparatus 1200 may be provided by a cloud service provider to the user by being abstracted into a cloud service of the neural network on a cloud service platform. After the user purchases the cloud service on the cloud service platform, a cloud environment provides, by using the cloud service, the user with a cloud service for processing data by using the neural network. The user may upload to-be-processed data to the cloud environment through an API or a web page interface provided by the cloud service platform. The apparatus 1200 receives the to-be-processed data, and processes the to-be-processed data by using the neural network. Data finally obtained through processing is returned by the apparatus 1200 to an edge device of the user.

When the apparatus 1200 is a software apparatus, the apparatus 1200 may alternatively be independently deployed on a computing device in any environment.

Figure 13:
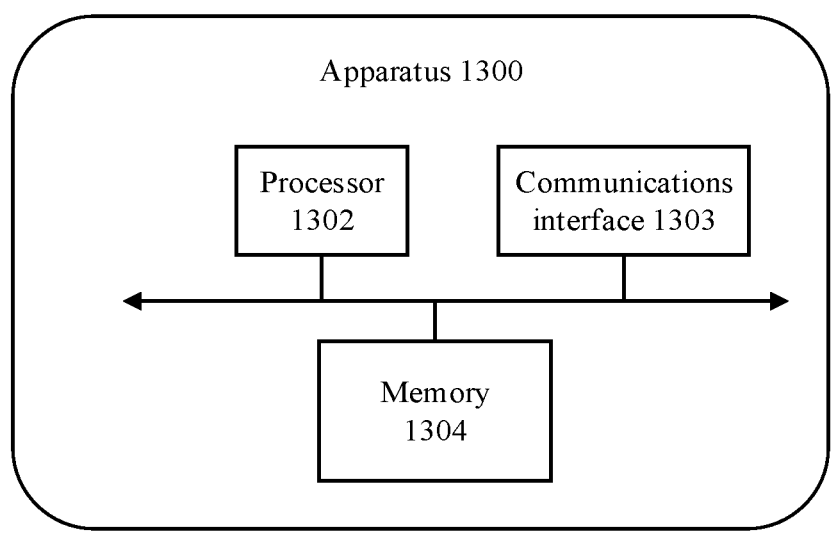
FIG. 13 is a diagram of an example structure of an apparatus according to this disclosure.

This disclosure further provides an apparatus 1300 shown in FIG. 13. The apparatus 1300 includes a processor 1302, a communications interface 1303, and a memory 1304. An example of the apparatus 1300 is a chip. Another example of the apparatus 1300 is a computing device.

The processor 1302, the memory 1304, and the communications interface 1303 may communicate with each other by using a bus. The memory 1304 stores executable code, and the processor 1302 reads the executable code in the memory 1304 to perform a corresponding method. The memory 1304 may further include an operating system and other software modules required for running processes. The operating system may be LINUX™, UNIX™, WINDOWS™, or the like.

For example, the executable code in the memory 1304 is used to implement the method shown in any one of FIG. 7 to FIG. 10. The processor 1302 reads the executable code in the memory 1304, to perform the method shown in any one of FIG. 7 to FIG. 10.

The processor 1302 may be a CPU. The memory 1304 may include a volatile memory, for example, a RAM. The memory 1304 may further include a nonvolatile memory (NVM), for example, a read-only memory (ROM), a flash memory, a hard disk drive (HDD), or a solid-state disk (SSD).

Table 1 to Table 3 are diagrams of a comparison of test precision on a same test set between a convolutional neural network obtained through training by using image training data by using the method or apparatus in this disclosure and a convolutional neural network obtained through training by using the method or apparatus in the conventional technology. A CIFAR-10 dataset is a dataset published by the Canadian Institute for Advanced Research, and includes 10 classes of images. A CIFAR-100 dataset is a dataset published by the Canadian Frontier Research Institute, and includes 100 classes of images. An ImageNet dataset is a public dataset used in the ImageNet large scale visual recognition challenge (ILSVRC) competition.

TABLE 1

Classification results on a CIFAR-10 dataset and a CIFAR-100 dataset

| Neural network | Test precision (%) | Test precision (%) |
|---|---|---|
| CNN | 81.99 | 49.72 |
| CNN | 82.95 | 54.19 |
| CNN | 83.15 | 54.53 |
| CNN | 82.13 | 54.26 |
| CNN | 83.11 | 54.65 |
| CNN | 85.24 | 56.23 |

In Table 1, the first column indicates that a trained neural network is a CNN, and the convolutional neural network includes three convolutional layers and two fully connected layers, the second column indicates test precision of a neural network obtained by training the CNN in a corresponding training method used when the CIFAR-10 dataset is used as a test set, the third column indicates test precision of the neural network obtained by training the CNN in a corresponding training method used when the CIFAR-100 dataset is used as a test set, and different rows correspond to different training methods. Output spaces of only two fully connected layers are perturbed in different training methods.

For example, perturbation is not performed in a training method corresponding to the second row, a training method corresponding to the third row is a method described in the paper "Srivastava et al. 2014", a training method corresponding to the fourth row is a method described in the paper "Kingma, Salimans, and welling 2015", a training method corresponding to the fifth row is the paper "Molchanov, Ashukha, and Vetrov 2017", a training method corresponding to the sixth row is a method described in the paper "Zhai and Wang 2018", and a training method corresponding to a last row includes an operation in the training method in this disclosure.

TABLE 2

Classification results on a CIFAR-10 dataset and a CIFAR-100 dataset

| Neural network | Test precision (%) | Test precision (%) |
|---|---|---|
| ResNet | 93.95 | 71.81 |
| ResNet | 94.18 | 73.08 |
| ResNet | 94.50 | 73.71 |

In Table 2, the first column indicates that a trained neural network is a residual network-56 (ResNet-56), and the convolutional neural network includes three convolutional layers and two fully connected layers, the second column indicates test precision of a neural network obtained by training ResNet-56 in a corresponding training method used when the CIFAR-10 dataset is used as a test set, the third column indicates test precision of the neural network obtained by training ResNet-56 in a corresponding training method used when the CIFAR-100 dataset is used as a test set, and different rows correspond to different training methods. Output spaces of only three convolutional layers are perturbed in different training methods.

For example, perturbation is not performed in a training method corresponding to the second row, a training method corresponding to the third row is a method described in the paper "Ghiasi, Lin, and Le 2018", and a training method corresponding to the last row includes an operation in the training method in this disclosure.

TABLE 3

Classification results on an ImageNet dataset

| Neural network | Test precision (%) | Test precision (%) |
|---|---|---|
| ResNet-50 | 76.51 | 93.20 |
| ResNet-50 | 76.80 | 93.41 |
| ResNet-50 | 77.10 | 93.50 |
| ResNet-50 | 77.41 | 93.74 |
| ResNet-50 | 76.52 | 93.21 |
| ResNet-50 | 77.63 | 93.82 |
| ResNet-50 | 77.17 | 93.45 |
| ResNet-50 | 78.13 | 94.02 |
| ResNet-50 | 77.71 | 93.89 |
| ResNet-50 | 78.76 | 94.33 |

In Table 3, the first column indicates that the trained neural network is a residual difference network-50 (ResNet-50), and the convolutional neural network includes three convolutional layers and two fully connected layers, the second column and the third column indicate test precision of a neural network obtained by training ResNet-50 in a corresponding training method used when the ImageNet dataset is used as a test set, and different rows correspond to different training methods. The second column is test precision obtained based on the following test criterion. Classification is considered to be accurate if a classification result with a highest probability in classification results output by the neural network is the same as a tested classification result, or classification is considered to be inaccurate if a classification result with a highest probability in classification results output by the neural network is different from a tested classification result. The test precision in the second column may also be referred to as top-1 precision. The third column is test precision obtained based on the following test criterion. Classification is considered to be accurate if classification results corresponding to first five probabilities include a tested classification result after classification results output by the neural network are ranked in descending order of probabilities, or classification is considered to be inaccurate if classification results corresponding to first five probabilities do not include a tested classification result after classification results output by the neural network are ranked in descending order of probabilities. The test precision in the third column may also be referred to as top-5 precision. Output spaces of only three convolutional layers are perturbed in different training methods.

For example, perturbation is not performed in a training method corresponding to the second row, a training method corresponding to the third row is a method described in the paper "Srivastava et al. 2014", a training method corresponding to the fourth row is a method described in the paper "Larsson, Maire, and Shakhnarovich 2016", a training method corresponding to the fifth row is a method described in the paper "Tompson et al. 2015", a training method corresponding to the sixth row is a method described in the paper "DeVries and Taylor 2017", a training method corresponding to the seventh row is a method described in the paper "Cubuk et al. 2018", a training method corresponding to the eighth row is a method described in the paper "Szegedy et al. 2016", a training method corresponding to the ninth row is a method described in the paper "Ghiasi, Lin, and Le 2018", and training methods corresponding to the penultimate row and the last row include an operation in the training method in this disclosure. A difference lies in that, when $m_i$ is used in the method corresponding to the penultimate row, a value of each element in $m_i$ is directly obtained through random initialization, and when $m_i$ is used in the training method corresponding to the last row, a value of each element in $m_i$ is obtained in a manner of "each element in $m_i$ is first randomly initialized to 0 or 1, and then some or all elements around an element initialized to 1 are also set to 1".

It can be learned from Table 1 to Table 3 that performance existing when the convolutional neural network trained in the method in this disclosure processes an image is far better than performance existing when the convolutional neural network trained in another method processes an image. Further, in comparison with the other method, the method or apparatus in this disclosure can be used to greatly improve accuracy of the convolutional neural network on an image test set, reduce a difference between accuracy of the convolutional neural network on an image training set and the accuracy of the convolutional neural network on the image test set, and improve generalization performance.

Table 4 is a diagram of a comparison of test precision on a same test set between a recurrent neural network obtained through text training and data training by using the method or apparatus in this disclosure and a recurrent neural network obtained through training by using the method or apparatus in the conventional technology. An IMDb dataset is an Internet movie database (IMDb).

TABLE 4

Experimental results on an IMDb dataset

| Neural network | Test precision (%) |
|---|---|
| LSTM | 81.88 |
| LSTM | 82.17 |
| LSTM | 82.40 |

In Table 4, the first column indicates that the trained neural network is a recurrent neural network including an LSTM unit, and the recurrent neural network may be referred to as an LSTM network, the second column indicates test precision of a neural network obtained by training the LSTM network in a corresponding training method used when the IMDb dataset is used as a test set, and different rows correspond to different training methods.

For example, perturbation is not performed in a training method corresponding to the second row, a training method corresponding to the third row is a method described in the paper "Srivastava et al. 2014", and a training method corresponding to the fourth row includes an operation in the training method in this disclosure.

It can be learned from Table 4 that, performance existing when the LSTM network obtained through training in the method in this disclosure processes text is far better than performance existing when an LSTM network obtained through training in another method processes the same text. Further, in comparison with the other method, the method or apparatus in this disclosure can be used to greatly improve accuracy of the LSTM network on a text test set, reduce a difference between accuracy of the LSTM network on a text training set and the accuracy of the LSTM network on the image test set, and improve generalization performance.

Table 5 is a diagram of a comparison of test precision on a same speech dataset between a recurrent neural network obtained through training by using speech training data by using the method or apparatus in this disclosure and a recurrent neural network obtained through training by using the method or apparatus in the conventional technology. The speech dataset is a speech classification dataset named UrbanSoundk8k, and includes 8732 excerpts of labeled speech in 10 classes.

TABLE 5

Experimental results on an UrbanSoundk8k dataset

| Neural network | Test precision (%) |
|---|---|
| LSTM | 72.79 |
| LSTM | 78.31 |
| LSTM | 78.68 |

In Table 5, the first column indicates that the trained neural network is a recurrent neural network including an LSTM unit, and the recurrent neural network may be referred to as an LSTM network, the second column indicates test precision of a neural network obtained by training the LSTM network in a corresponding training method used when the UrbanSoundk8k dataset is used as a test set, and different rows correspond to different training methods.

For example, perturbation is not performed in a training method corresponding to the second row, a training method corresponding to the third row is a method described in the paper "Srivastava et al. 2014", and a training method corresponding to the fourth row includes an operation in the training method in this disclosure.

It can be learned from Table 5 that, performance existing when an LSTM network obtained through training in the method in this disclosure processes speech data is far better than performance existing when an LSTM network obtained through training in another method processes the same speech data. Further, in comparison with the other method, the method or apparatus in this disclosure can be used to greatly improve accuracy of the LSTM network on a speech test set, reduce a difference between accuracy of the LSTM network on a speech training set and the accuracy of the LSTM network on the speech test set, and improve generalization performance.

A person of ordinary skill in the art may be aware that, in combination with the examples described in embodiments disclosed in this specification, units and algorithm steps may be implemented by electronic hardware or a combination of computer software and the electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected based on actual requirements to achieve the objectives of the solutions in the embodiments.

In addition, functional units in embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or a part of the steps of the method described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A neural network training method comprising:
    inputting, into a neural network, training data comprising an image, text, or speech;
    determining, based on a first output space of a first target layer in the neural network and a target perturbation value of the first output space, a first input space of a second target layer in the neural network, wherein the target perturbation value is based on an initial perturbation value of the first output space and a perturbation value increment of the first output space, wherein the perturbation value increment is based on the initial perturbation value, a weight matrix of the second target layer, and a target function, and wherein the target function is a function of a perturbation value of the first output space and comprises a first relational expression for determining Rademacher complexity of the second target layer based on a second input space of the second target layer and the weight matrix; and
    inputting a first feature vector in the first input space into the second target layer to train the neural network,
    wherein a first capability of fitting random noise using a second output space that is of a third target layer in the neural network and that exists when the first feature vector in the first input space is input into the second target layer is lower than a second capability of fitting the random noise using a third output space that is of the third target layer and that exists when a second feature vector in the first output space is input into the second target layer.

2. The neural network training method of claim 1, further comprising:
    determining, based on the second output space, a first Rademacher complexity of the third target layer; and
    determining, based on the third output space, a second Rademacher complexity of the third target layer,
    wherein the first Rademacher complexity is less than the second Rademacher complexity.

3. The neural network training method of claim 1, wherein the second target layer is a first layer after the first target layer.

4. The neural network training method of claim 1, wherein the first relational expression is for determining the second input space of the second target layer based on the perturbation value and the first output space, and wherein the perturbation value increment is a gradient of the target function.

5. The neural network training method of claim 1, wherein determining the first input space based on the target perturbation value and the first output space comprises:

determining, based on the target perturbation value, the first output space, and the weight matrix, a target function value of the target function;

when a difference between the target function value and an initial function value is less than or equal to a preset threshold:

performing, based on the target perturbation value, perturbation adjustment on the first output space; and determining that a fourth output space obtained through adjustment is the first input space; and when the difference between the target function value and the initial function value is greater than the preset threshold:

updating the initial function value to the target function value;

updating the initial perturbation value to the target perturbation value; and repeatedly performing step 1 to step 3 until the difference between the target function value and the initial function value is less than or equal to the preset threshold.

6. The neural network training method of claim 5, wherein the target function further comprises a term that is a function of the perturbation value.

7. The neural network training method of claim 5, wherein the target function is:

$$\frac{1}{N}\left[\sup_k\left|\left\langle K'[k,:], \sum_{i=1}^{N}\sigma_i[f(x_i)-m_i\circ\varepsilon_i]\right\rangle\right| + \frac{\lambda}{2}\sum_{i=1}^{N}\|\varepsilon_i\|_2^2\right],$$

wherein $\sigma_i$ is −1 or 1, wherein K'[k,:] represents a $k^{th}$ row in the weight matrix, wherein "$\langle,\rangle$" represents pointwise multiplication, wherein $$\sup_k\left|\left\langle K'[k,:]^T, \sum_{i=1}^{N}\sigma_i[f(x_i)-m_i\circ\varepsilon_i]\right\rangle\right|$$

represents that k in $$\sup_k\left|\left\langle K'[k,:]^T, \sum_{i=1}^{N}\sigma_i[f(x_i)-m_i\circ\varepsilon_i]\right\rangle\right|$$

maximizes a value of $$\left|\left\langle K'[k,:]^T, \sum_{i=1}^{N}\sigma_i[f(x_i)-m_i\circ\varepsilon_i]\right\rangle\right|,$$

wherein "$\|\ \|_2$" represents a quadratic norm, wherein $f(x_i)$ represents an $i^{th}$ output space in the first output space, wherein the $i^{th}$ output space corresponds to $i^{th}$ data in the training data, wherein i is a positive integer less than or equal to N, wherein N is an amount of the training data, wherein "$\circ$" represents element-wise multiplication, wherein a first length of $m_i$ is the same as a second length of $f(x_i)$, wherein a value of each element in $m_i$ is 0 or 1, wherein $\varepsilon_i$ indicates the perturbation value, and wherein $\lambda$ is a preconfigured parameter value.

8. The neural network training method of claim 4, wherein the first output space, the perturbation value, and the first input space satisfy a relationship, and wherein the relationship is:

$$\hat{f}(x_i)=f(x_i)-m_i\circ\varepsilon_i,$$

wherein $f(x_i)$ represents an $i^{th}$ output space in the first output space, wherein the $i^{th}$ output space corresponds to $i^{th}$ data in the training data, wherein i is a positive integer less than or equal to N, wherein N is an amount of the training data, wherein "$\circ$" represents element-wise multiplication, wherein $\hat{f}(x_i)$ represents an $i^{th}$ input space obtained by performing perturbation adjustment on the $i^{th}$ output space, wherein a first size of $m_i$ is the same as a second size of $f(x_i)$, wherein a value of each element in $m_i$ is 0 or 1, and wherein $\varepsilon_i$ represents the perturbation value.

9. The neural network training method of claim 1, wherein the neural network is a convolutional neural network, and wherein the first target layer is either a convolutional layer or a fully-connected layer.

10. The neural network training method of claim 1, wherein the neural network is a recurrent neural network, and wherein the first target layer comprises a long short-term memory block, a bidirectional recurrent neural network block, a memory network block, or a gate recurrent block.

11. A neural network training apparatus comprising:

a memory configured to store instructions; and a processor coupled to the memory, wherein the instructions cause the processor to be configured to:

input, into a neural network, training data comprising an image, text, or speech;

determine, based on a first output space of a first target layer in the neural network and a target perturbation value of the first output space, a first input space of a second target layer in the neural network, wherein the target perturbation value is based on an initial perturbation value of the first output space and a perturbation value increment of the first output space, wherein the perturbation value increment is based on the initial perturbation value, a weight matrix of the second target layer, and a target function, and wherein the target function is a function of a perturbation value of the first output space and comprises a first relational expression for determining Rademacher complexity of the second target layer based on a second input space of the second target layer and the weight matrix; and input a first feature vector in the first input space into the second target layer to train the neural network, wherein a first capability of fitting random noise using a second output space that is of a third target layer in the neural network and that exists when the first feature vector in the first input space is input into the second target layer is lower than a second capability of fitting the random noise using a third output space that is of the third target layer and that exists when a second feature vector in the first output space is input into the second target layer.

12. The neural network training apparatus of claim 11, wherein the instructions further cause the processor to be configured to:

determine, based on the second output space, first Rademacher complexity of the third target layer; and determine, based on the third output space, second Rademacher complexity of the third target layer, wherein the first Rademacher complexity is less than the second Rademacher complexity.

13. The neural network training apparatus of claim 11, wherein the second target layer is a first layer after the first target layer.

14. The neural network training apparatus of claim 11, wherein the first relational expression is for determining the second input space of the second target layer based on the perturbation value and the first output space, and wherein the perturbation value increment is a gradient of the target function.

15. The neural network training apparatus of claim 11, wherein the instructions further cause the processor to be configured to:
- determine, based on the target perturbation value, the first output space, and the weight matrix, a target function value of the target function;
- when a difference between the target function value and an initial function value is less than or equal to a preset threshold:
  - perform, based on the target perturbation value, perturbation adjustment on the first output space; and
  - determine that a fourth output space obtained through adjustment is the first input space; and
- when the difference between the target function value and the initial function value is greater than the preset threshold:
  - update the initial function value to the target function value;
  - update the initial perturbation value to the target perturbation value; and
  - repeatedly perform step 1 to step 3 until the difference between the target function value and the initial function value is less than or equal to the preset threshold.

16. The neural network training apparatus of claim 15, wherein the target function further comprises a term that is a function of the perturbation value.

17. The neural network training apparatus of claim 15, wherein the target function is:

$$\frac{1}{N}\left[\sup_k \left|\left\langle K'[k,:], \sum_{i=1}^{N}\sigma_i[f(x_i)-m_i \circ \varepsilon_i]\right\rangle\right| + \frac{\lambda}{2}\sum_{i=1}^{N}\|\varepsilon_i\|_2^2\right],$$

wherein $\sigma_i$ is $-1$ or $1$, $K'[k,:]$ represents a $k^{th}$ row in the weight matrix, wherein "$\langle,\rangle$" represents point-wise multiplication, wherein $$\sup_k \left|\left\langle K'[k,:]^T, \sum_{i=1}^{N}\sigma_i[f(x_i)-m_i \circ \varepsilon_i]\right\rangle\right|$$

represents that k in $$\sup_k \left|\left\langle K'[k,:]^T, \sum_{i=1}^{N}\sigma_i[f(x_i)-m_i \circ \varepsilon_i]\right\rangle\right|$$

maximizes a value of $$\left|\left\langle K'[k,:]^T, \sum_{i=1}^{N}\sigma_i[f(x_i)-m_i \circ \varepsilon_i]\right\rangle\right|,$$

wherein "$\|\ \|_2$" represents a quadratic norm, wherein $f(x_i)$ represents an $i^{th}$ output space in the first output space, wherein the $i^{th}$ output space corresponds to $i^{th}$ data in the training data, wherein i is a positive integer less than or equal to N, wherein N is an amount of the training data, wherein "$\circ$" represents element-wise multiplication, wherein a first length of $m_i$ is the same as a second length of $f(x_i)$, wherein a value of each element in $m_i$ is 0 or 1, wherein $\varepsilon_i$ indicates the perturbation value, and wherein $\lambda$ is a preconfigured parameter value.

18. The neural network training apparatus of claim 14, wherein the first output space, the perturbation value, and the first input space satisfy a relationship, and wherein the relationship is:

$$\hat{f}(x_i)=f(x_i)-m_i \circ \varepsilon_i,$$

wherein $f(x_i)$ represents an $i^{th}$ output space in the first output space, wherein the $i^{th}$ output space corresponds to $i^{th}$ data in the training data, wherein i is a positive integer less than or equal to N, wherein N is an amount of the training data, wherein "$\circ$" represents element-wise multiplication, wherein $\hat{f}(x_i)$ represents an $i^{th}$ input space obtained by performing perturbation adjustment on the $i^{th}$ output space, wherein a first size of $m_i$ is the same as a second size of $f(x_i)$, wherein a value of each element in $m_i$ is 0 or 1, and wherein $\varepsilon_i$ represents the perturbation value.

19. The neural network training apparatus of claim 11, wherein the neural network is a convolutional neural network, and wherein the first target layer is either a convolutional layer or a fully connected layer.

20. The neural network training apparatus of claim 11, wherein the neural network is a recurrent neural network, and wherein the first target layer comprises a long short-term memory block, a bidirectional recurrent neural network block, a memory network block, or a gate recurrent block.

21. A computer program product comprising computer-executable instructions that are stored on a non-transitory computer-readable medium and that, when executed by a processor, cause an apparatus to:
- input, into a neural network, training data comprising an image, text, or speech;
- determine, based on a first output space of a first target layer in the neural network and a target perturbation value of the first output space, a first input space of a second target layer in the neural network, wherein the target perturbation value is based on an initial perturbation value of the first output space and a perturbation value increment of the first output space, wherein the perturbation value increment is based on the initial perturbation value, a weight matrix of the second target layer, and a target function, and wherein the target function is a function of a perturbation value of the first output space and comprises a first relational expression for determining Rademacher complexity of the second target layer based on a second input space of the second target layer and the weight matrix; and
- input a first feature vector in the first input space into the second target layer to train the neural network, wherein a first capability of fitting random noise using a second output space that is of a third target layer in the neural network and that exists when the first feature vector is input into the second target layer is lower than a second capability of fitting the random noise using a third output space that is of the third target layer and that exists when a second feature vector in the first output space is input into the second target layer.

* * * * *